(12) United States Patent
Iijima

(10) Patent No.: US 11,391,697 B2
(45) Date of Patent: Jul. 19, 2022

(54) MAGNETIC BODY INSPECTION DEVICE AND MAGNETIC BODY INSPECTION METHOD

(71) Applicant: Shimadzu Corporation, Kyoto (JP)

(72) Inventor: Kenji Iijima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/055,070

(22) PCT Filed: May 7, 2019

(86) PCT No.: PCT/JP2019/018273
§ 371 (c)(1),
(2) Date: Nov. 12, 2020

(87) PCT Pub. No.: WO2019/220953
PCT Pub. Date: Nov. 21, 2019

(65) Prior Publication Data
US 2021/0215639 A1 Jul. 15, 2021

(30) Foreign Application Priority Data
May 15, 2018 (JP) ............... JP2018-093812

(51) Int. Cl.
*G01N 27/82* (2006.01)
(52) U.S. Cl.
CPC .................. *G01N 27/82* (2013.01)
(58) Field of Classification Search
CPC .................................................. G01N 27/82
See application file for complete search history.

(56) References Cited

U.S. PATENT DOCUMENTS

| 5,321,356 A | 6/1994 | Weischedel |
| 7,501,813 B2* | 3/2009 | Suzuki ............... G01D 5/145 324/207.2 |
| 7,663,458 B2* | 2/2010 | Reinschke ........... A61B 34/70 335/299 |

(Continued)

FOREIGN PATENT DOCUMENTS

| DE | 10026313 A1 | 7/2001 |
| JP | 2733088 B | 10/1990 |

(Continued)

OTHER PUBLICATIONS

Notice of Reasons for Refusal dated Nov. 12, 2021 for corresponding Japanese Patent Application No. 2020-519573.

(Continued)

*Primary Examiner* — Dominic E Hawkins
(74) *Attorney, Agent, or Firm* — Muir Patent Law, PLLC

(57) ABSTRACT

A magnetic body inspection device (100) is provided with a magnetic field application unit (1) configured to apply a magnetic field to a magnetic body (W) to be inspected in advance to rectify the magnitude and orientation of magnetization in the magnetic body (W), and a detection unit (2) configured to output a detection signal based on the magnetic field in the magnetic body to which the magnetic field application unit has been applied or a change in the magnetic field. The magnetic application unit includes magnets (11) arranged such that pole faces (Pf) of the same polarity are opposed to each other on both sides of the magnetic body.

17 Claims, 15 Drawing Sheets

First Embodiment

(56) References Cited

U.S. PATENT DOCUMENTS

| | | | | |
|---|---|---|---|---|
| 2003/0016026 A1* | 1/2003 | Kawaike | ............... | G01R 31/315 |
| | | | | 324/537 |
| 2004/0123677 A1* | 7/2004 | Omata | ................. | G01D 5/2046 |
| | | | | 73/862.324 |
| 2013/0147471 A1* | 6/2013 | Weischedel | ............ | G01N 27/83 |
| | | | | 324/238 |
| 2015/0130454 A1 | 5/2015 | Itoi et al. | | |
| 2017/0102250 A1* | 4/2017 | Franke | ................... | G01D 5/147 |
| 2019/0360965 A1 | 11/2019 | Ijima | | |

FOREIGN PATENT DOCUMENTS

| | | |
|---|---|---|
| JP | 2000-023958 A | 1/2000 |
| JP | 2000-351575 A | 12/2000 |
| JP | 2003-302379 A | 10/2003 |
| JP | 2006-010646 A | 1/2006 |
| JP | 2010-008213 A | 1/2010 |
| JP | 2012-103177 A | 5/2012 |
| JP | 2019-015656 A | 1/2019 |
| WO | 2018/138850 A1 | 2/2018 |

OTHER PUBLICATIONS

Written Opinion by the International Search Authority for PCT application No. PCT/JP2019/018273, dated Jun. 18, 2019, submitted with a machine translation.

Notice of Reasons for Refusal dated May 17, 2022 for corresponding Japanese Patent Application No. JP 2020-519573, submitted with a machine translation.

Extended European Search Report (EESR) dated Jan. 26, 2022 in the corresponding European patent application No. 19802500.9.

* cited by examiner

First Embodiment

First Embodiment

FIG. 5
First Embodiment
(A)
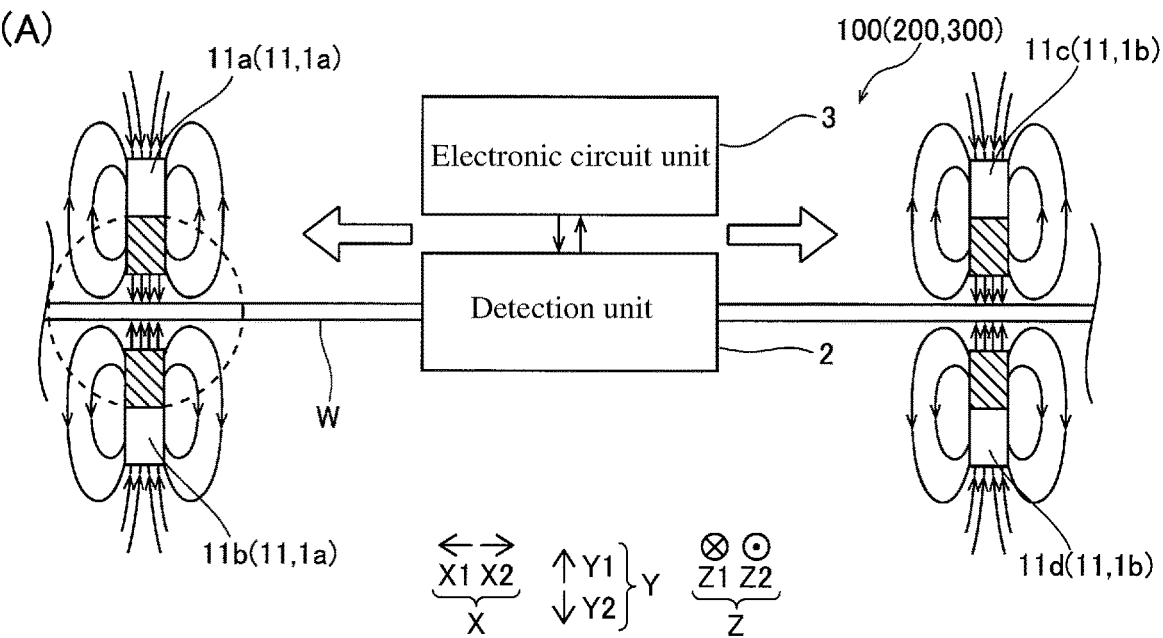
(B)
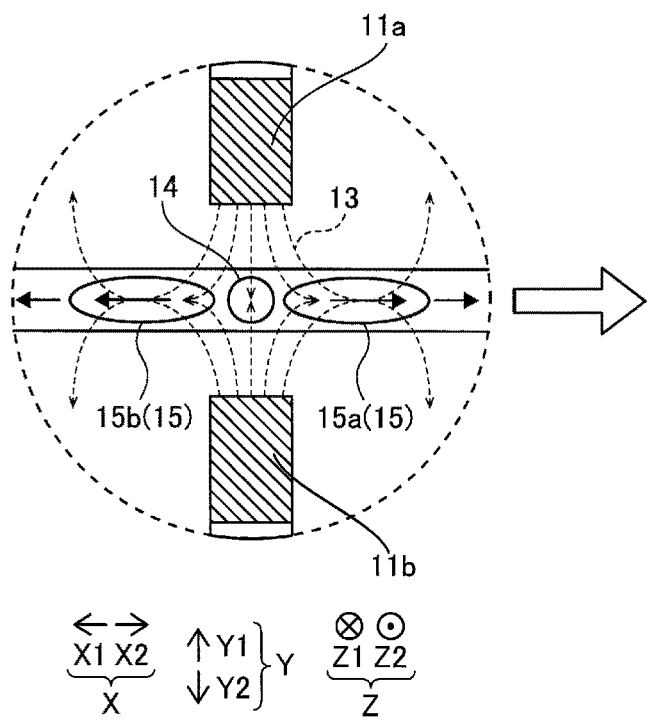

First Embodiment

First Embodiment

FIG. 8
First Comparative Example
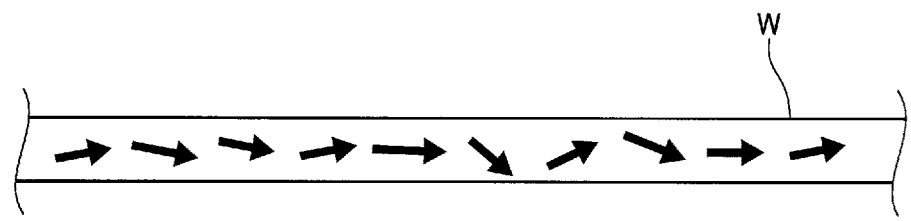
FIG. 9
(A) First Comparative Example
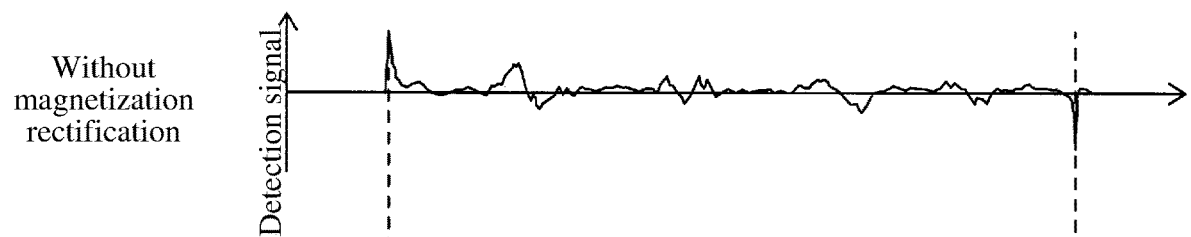
Without magnetization rectification
(B) First Embodiment
With magnetization rectification
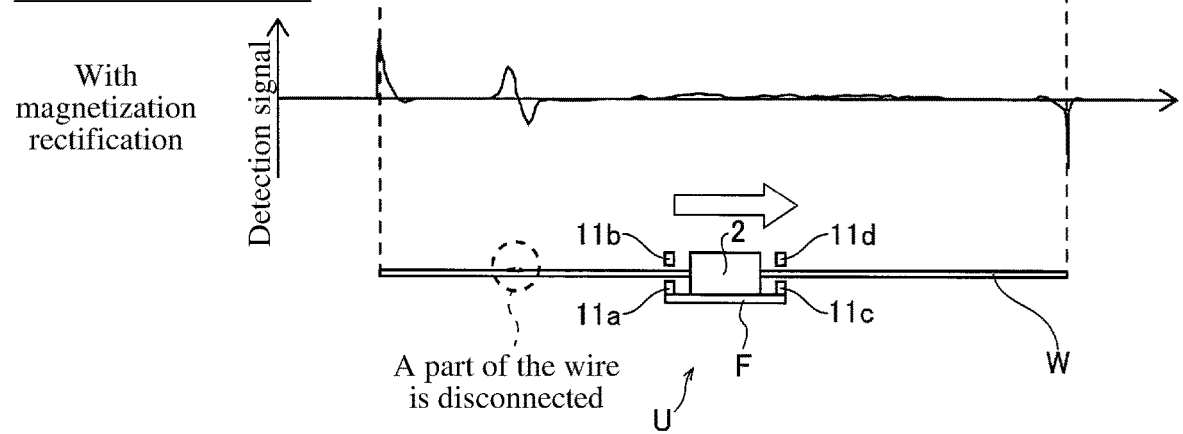

FIG.11
(A) First Embodiment
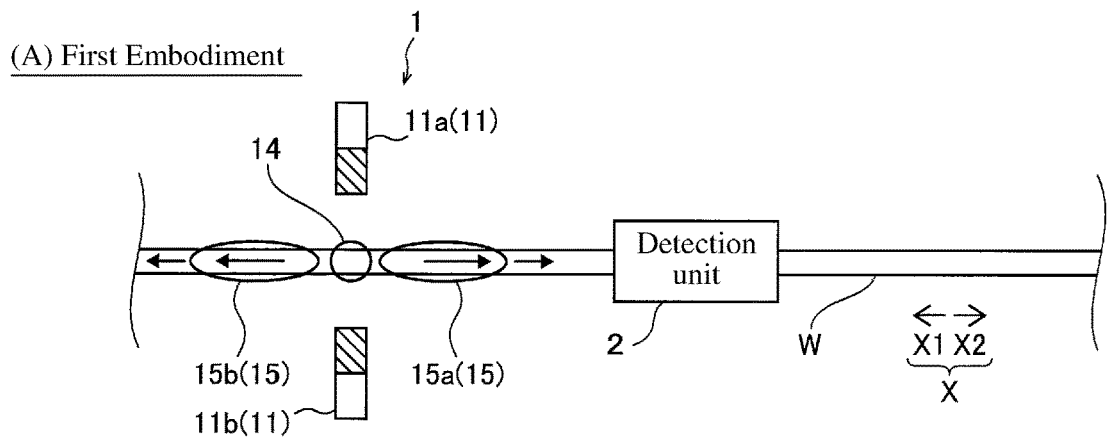
(B) Second Comparative Example
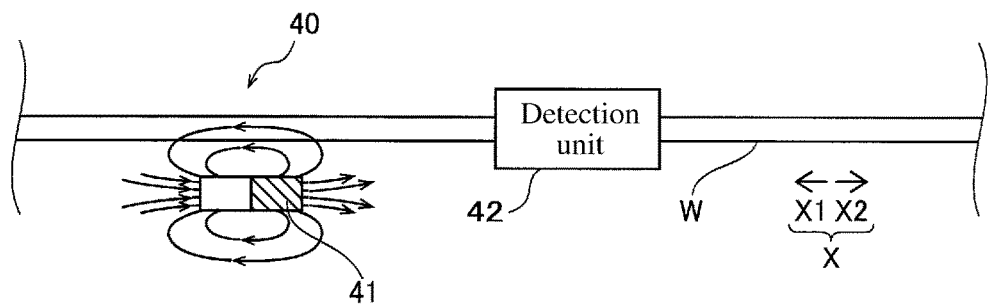
FIG. 12
(A) First Embodiment
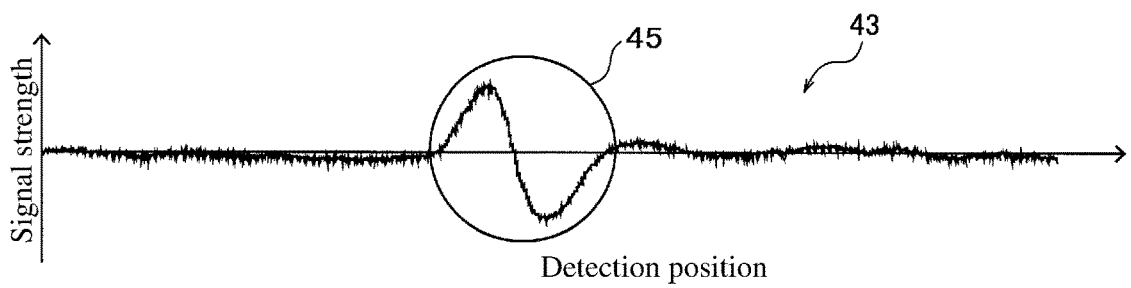
Detection position
(B) Second Comparative Example
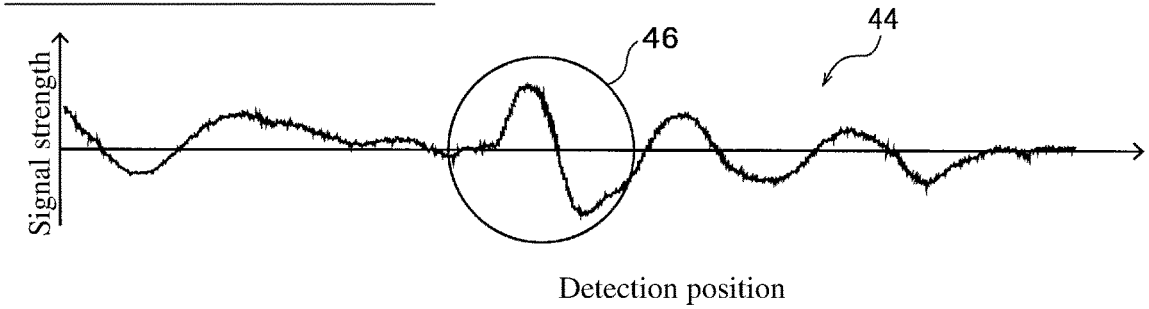
Detection position

FIG. 13
Second Embodiment
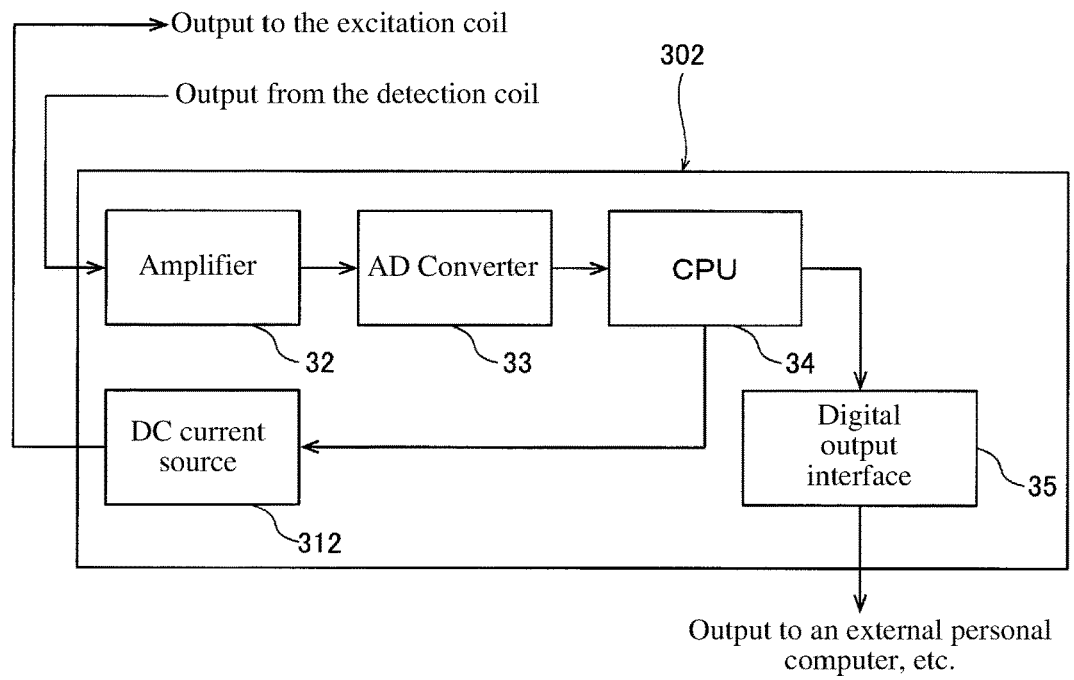
FIG. 14
Third Embodiment
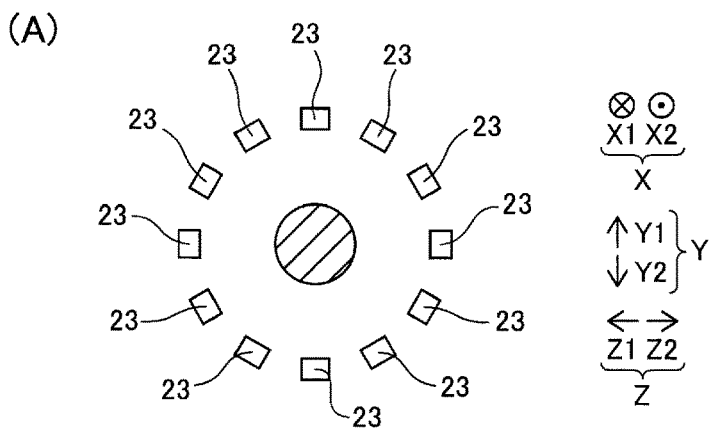
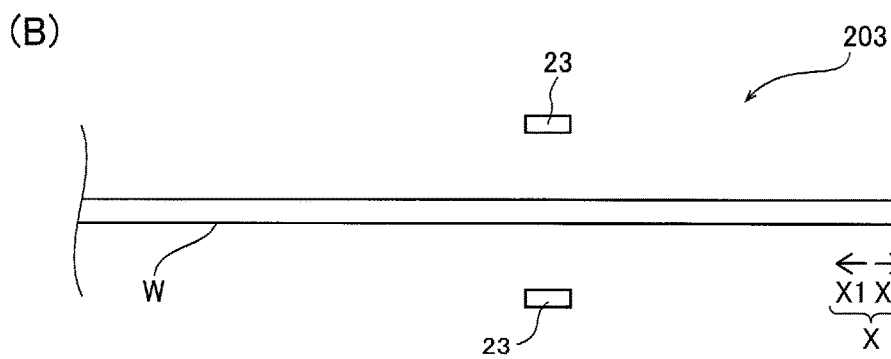

Third Embodiment

Output to an external personal computer, etc.

FIG. 16
First Modification
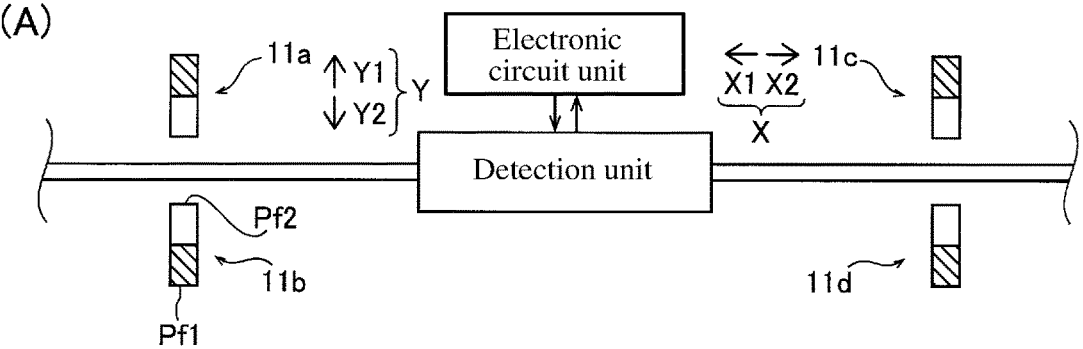
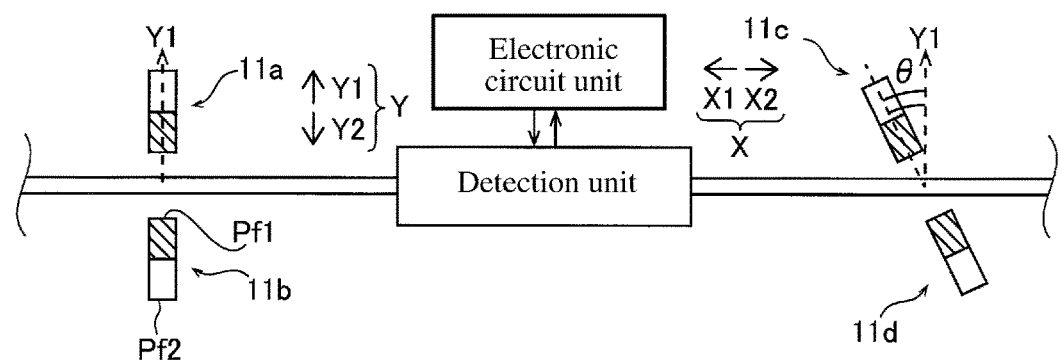
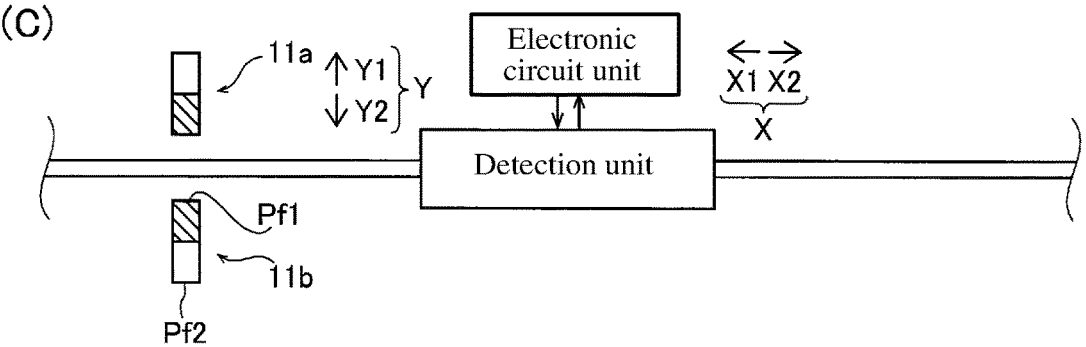

FIG. 17
Second Modification
(A)
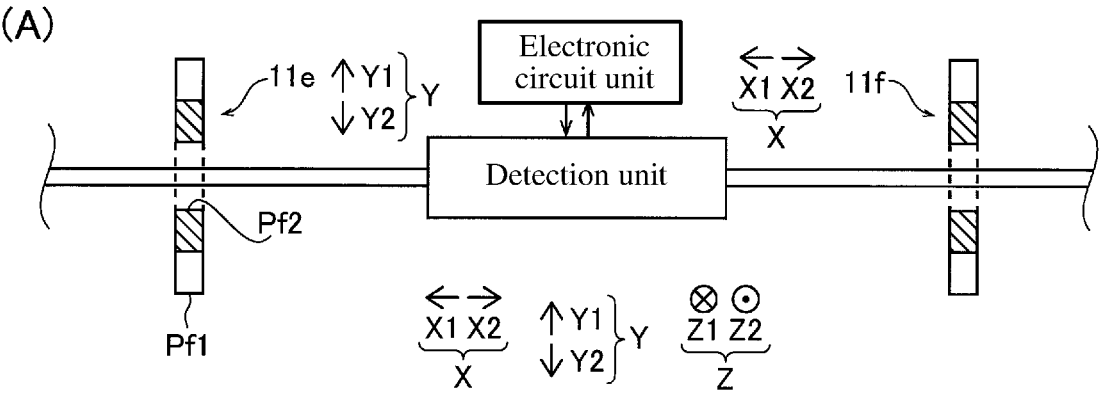
(B)
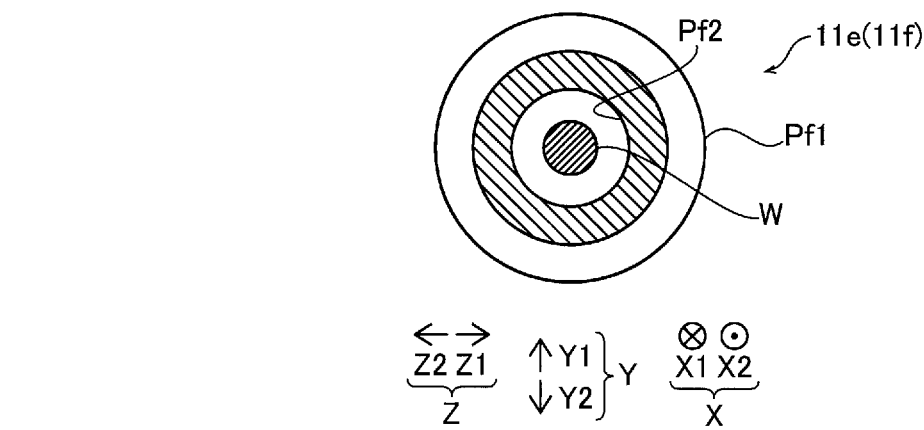

Third Modification

Fourth Modification

Fifth Modification

FIG. 21
Sixth Modification
(A)
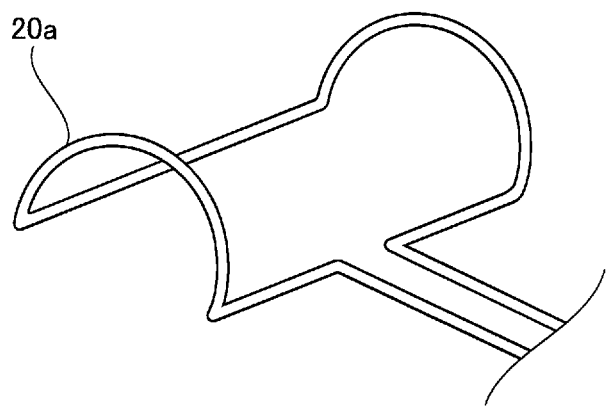
(B)
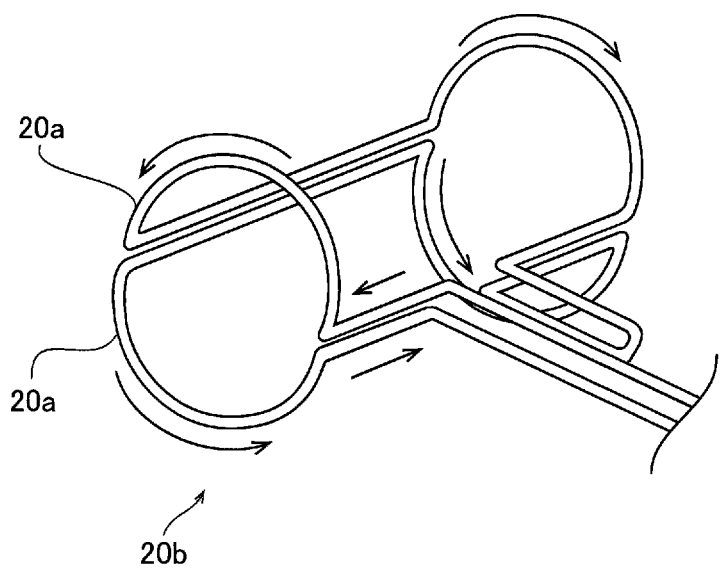

FIG. 22
Seventh Modification
(A)
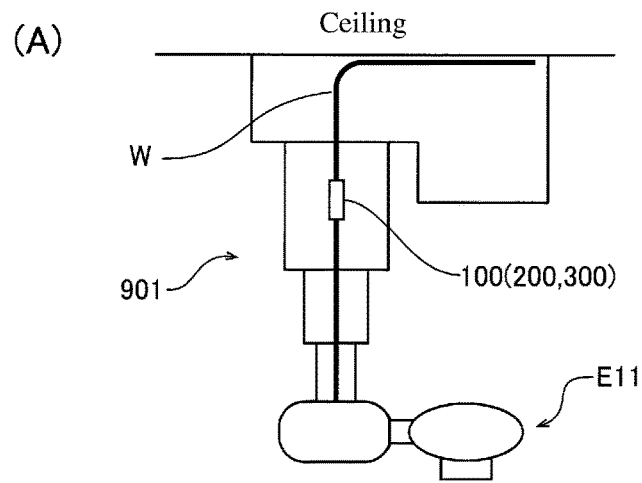
(B)
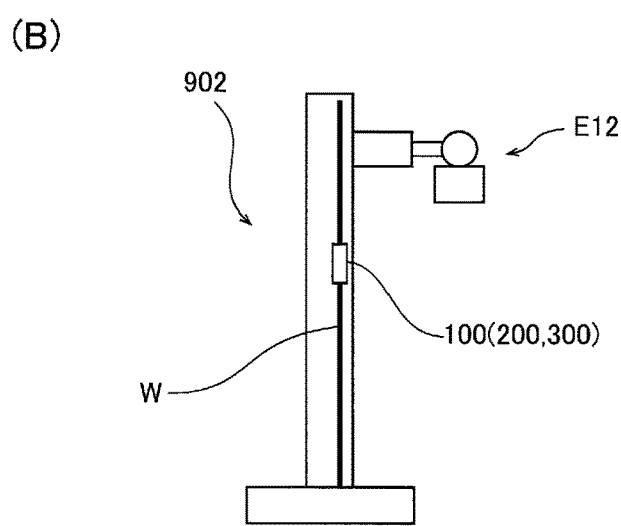
(C)
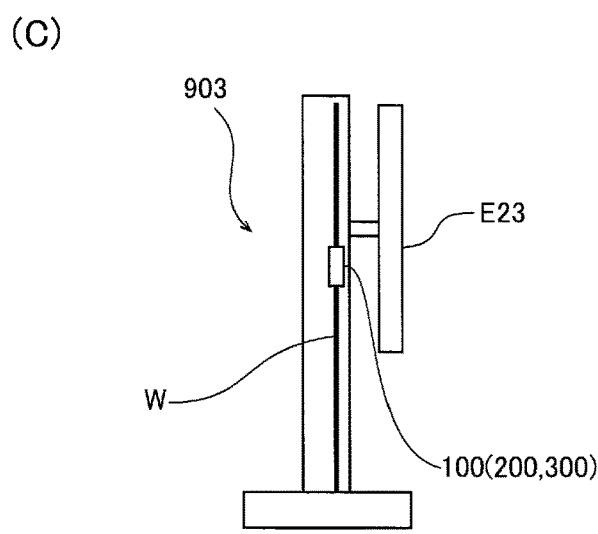

MAGNETIC BODY INSPECTION DEVICE AND MAGNETIC BODY INSPECTION METHOD

TECHNICAL FIELD

The present invention relates to a magnetic body inspection device and a magnetic body inspection method, and more specifically to a magnetic body inspection device equipped with a detection unit for detecting a magnetic field in a magnetic body and a magnetic body inspection method.

BACKGROUND ART

Conventionally, a magnetic body inspection device equipped with a detection unit for detecting a magnetic field in a magnetic body is known. Such a magnetic body inspection device is disclosed in, for example, Japanese Unexamined Patent Application Publication No. 2003-302379.

Japanese Unexamined Patent Application Publication No. 2003-302379 discloses a magnetic body inspection device equipped with: a coil holder provided so as to be relatively movable with respect to a steel wire cable extending in the longitudinal direction on the outer periphery of the steel wire cable; and an excitation coil and a detection coil each provided so as to be wound around the outer periphery of the coil holder along the extending direction of the steel wire cable centering the steel wire cable. The excitation coil is configured to apply a magnetic field to the steel wire cable in the longitudinal direction of the steel wire cable. The detection coil is configured to detect the longitudinal leakage magnetization in the steel wire cable causing from the steel wire cable and output the detection signal. Further, the magnetic body inspection device disclosed in Japanese Unexamined Patent Application Publication No. 2003-302379 is configured to detect the leakage of the magnetic field occurring at a position where the steel wire cable is disconnected by relatively moving the coil holder and the steel wire cable longitudinally and warn the disconnection of the steel wire cable.

PRIOR ART DOCUMENT

Patent Document

Patent Document 1: Japanese Unexamined Patent Application Publication No. 2003-302379

SUMMARY OF THE INVENTION

Problems to be Solved by the Invention

However, in the magnetic body inspection device of Japanese Unexamined Patent Application Publication No. 2003-302379, it also detects the noise due to variations in magnetization in the steel wire cable. Specifically, the magnitude and orientation of magnetization inside a magnetic body, such as, e.g., steel wire cable, sometimes are not aligned so as to be constant in the magnitude and orientation at the time of the production (and after the production). Furthermore, the magnitude and orientation of the magnetization inside the magnetic body change due to stress, bending, or the like caused when passing through a pulley or the like and become non-uniform. Therefore, even in a portion of the steel wire cable where there is no breakage/disconnection, the detection coil may sometimes detect a signal based on noise due to variations in magnitude and orientation of magnetization in the steel wire cable. In such cases, the state (presence or absence of damage or the like) of the magnetic body cannot be easily determined.

The present invention has been made in order to solve the above-described problems, and an object of the present invention is to provide a magnetic body inspection device and a magnetic body inspection method capable of easily determining a state (presence or absence of damage or the like) of a magnetic body.

Means for Solving the Problems

In order to achieve the above-described object, the magnetic body inspection device according to the first aspect of the present invention includes:

a magnetic field application unit configured to apply a magnetic field to a magnetic body to be inspected in advance to rectify magnitude and orientation of magnetization in the magnetic body; and a detection unit configured to output a detection signal based on a magnetic field in the magnetic body to which the magnetic field has been applied by the magnetic field application unit or a change in the magnetic field, wherein the magnetic field application unit includes magnets arranged so that pole faces of the same polarity are opposed to each other on both sides of the magnetic body.

Note that in the present invention, the "damage or the like" in a magnetic body is a broad concept including: a change in a cross-sectional area (including a change caused by a gap when damage or the like occurred inside a magnetic body) with respect to a detection direction caused by slewing, local abrasion, strand breakage/disconnection, recess, corrosion, cracking, breakage, etc. of a magnetic body; a change in magnetic permeability caused by rusting, weld burning, mixing of impurities, compositional change, etc. of a magnetic body; and a portion where a magnetic body becomes non-uniform. Further note that the "change in the magnetic field" is a broad concept including: a temporal change in the intensity of the magnetic field detected by the detection unit due to a relative movement of the magnetic body and a detection unit; and a temporal change in the intensity of the magnetic field detected by the detection unit due to a temporally change in the magnetic field applied to the magnetic body. In addition, the "pole face" denotes a plane including the strongest point of the magnetic field in the magnetic field application unit. Also note that the "magnets are opposed" is a broad concept including a state in which the magnetic body is surrounded by an annular magnet in addition to a state in which a pair of magnets is opposed to each other.

The magnetic body inspection device according to the first aspect of the present invention is provided with, as described above, a magnetic field application unit configured to rectify magnitude and orientation of magnetization in a magnetic body, the magnetic field application unit including magnets arranged so that pole faces of the same polarity are opposed to each other on both sides of the magnetic body. Thus, a magnetic field is applied in advance to the magnetic body. Therefore, the magnitude and orientation of the magnetization in the portion of the magnetic body where there is no damage or the like are generally rectified or aligned. On the other hand, the magnitude and orientation of the magnetization in the portion of the magnetic body where there is damage or the like are not rectified or aligned. As a result, the detection signal output from the detection unit differs between the portion where there is damage or the like and the portion where there is no damage or the like, and therefore it is possible to easily determine the state (presence or absence of damage or the like) of the magnetic body. Further, it becomes possible to rectify the magnitude and orientation of the magnetization in the magnetic body by applying a magnetic field from both sides of the magnetic body. Therefore, as compared with the case of applying a magnetic field from one side of the magnetic body, it is possible to more efficiently rectify the magnitude and orientation of the magnetization in the magnetic body.

In the magnetic body inspection device according to the first aspect of the present invention, preferably, the magnets arranged so that the pole faces of the same polarity are opposed to each other on both sides of the magnetic body are configured to generate a region for canceling magnetic fields with respect to the magnetic body and a magnetization rectification region for rectifying the magnitude and orientation of the magnetization in the magnetic body by applying a magnetic field to the magnetic body before and after the region for canceling magnetic fields.

Here, for example, in a case of inspecting a state of a long magnetic body, such as, e.g., a steel wire cable, when applying a magnetic field to a magnetic body by a magnetic field application unit, magnetic poles are generated in the magnetic body in the short axis direction thereof. Therefore, depending on the arrangement of the magnetic field application unit, the magnetic body is attracted to the magnetic field application unit in the short axis direction of the magnetic body. For this reason, to prevent the magnetic body from being attracted to the magnetic field application unit, the tension to be applied to the magnetic body must be increased. By configuring as described above, when detecting the state (presence or absence of damage or the like) of the magnetic body, it becomes possible to pass the magnetic body through the magnetization rectification region, the region for canceling the magnetic fields, the magnetization rectification region, and the detection unit in this order. Therefore, by the region for canceling the magnetic fields, it becomes possible to suppress the generation of magnetic poles in the short axis direction of the magnetic body. This makes it possible to suppress the magnetic body from being attracted to the magnetic field application unit in the short axis direction and also possible to perform the magnetization rectification of the magnetic body by the magnetization rectification region. Consequently, as compared with the case in which the magnetic field application unit does not generate the region for canceling magnetic fields, it is suppressed that the magnetic body is attracted to the magnetic field application unit in the short axis direction. Therefore, it is possible to perform the magnetization rectification of the magnetic body without increasing the tension to be applied to the magnetic body.

In the magnetic body inspection device according to the first aspect of the present invention, preferably, the magnetic field application unit is configured to invert an orientation of the magnetic field applied to the magnetic body in the magnetization rectification regions across the region for canceling magnetic fields.

With this configuration, even in cases where the magnitude and orientation of the magnetization in the magnetic body before the magnetization rectification are oriented in any direction, it becomes possible to pass the magnetic body through the magnetization rectification region, the region for canceling magnetic fields, and the magnetization rectification region in this order. Therefore, it is possible to easily and assuredly perform the magnetization rectification of the elongated member. Further, the orientation of the magnetic field generated by the magnetic field application unit is reversed before and after the region for canceling the magnetic fields. As a result, it was found that it is possible to more accurately detect the change of the magnetic field as compared with the case in which the orientation of the magnetic field is not inverted.

In the configuration in which the magnetization rectification regions are generated before and after the region for canceling magnetic fields, preferably, the magnets are composed of a pair of magnets arranged so as to sandwich the magnetic body, the magnetic body is an elongated member, and the pair of magnets is configured to apply a magnetic field to the elongated member mainly in a direction along an extending direction of the elongated member.

Note that the magnet emits a magnetic field from one of pole faces toward the other pole face. Therefore, the orientation of the magnetic field becomes a curve including the direction along the extending direction of the elongated member as it goes away from the center of the pole face. Therefore, when it is configured to apply a magnetic field to the elongated member in a direction along the extending direction of the elongated member, even in the case of arranging a pair of magnets so as to sandwich the magnetic body, it is possible to easily rectify the magnitude and orientation of the magnetization in the magnetic body.

In the configuration in which the magnetic field is applied to the elongated member in a direction along the extending direction of the elongated member, preferably, the pair of magnets is arranged so that pole faces of one of the same polarities of the pair of magnets are not opposed and pole faces of the other of the same polarities of the pair of magnets are opposed to each other.

With this configuration, for example, even in the case of using a pair of rod-shaped magnets, each having both ends as pole faces, it is possible to arrange the pair of magnets in the short axis direction of the elongated member with the same polarities of the magnets opposed. Consequently, it becomes possible to apply a magnetic field to the elongated member in the short axis direction of the elongated member, which makes it possible to easily generate the region for canceling magnetic fields and the magnetization rectification region.

In the configuration in which a magnetic field is applied to the elongated member in a direction along the extending direction of the elongated member, preferably, the magnetic field application unit is provided at a position spaced apart from the detection unit in an extending direction of the elongated member by a predetermined distance.

Here, when the relative position between the detection unit and the magnetic field application unit changes, the magnetic field from the magnetic field application unit detected by the detection unit changes. The magnetic field from the magnetic field application unit to be detected by the detection unit changes. The change of the magnetic field from the magnetic field application unit to be detected by the detection unit becomes a factor that causes noise in the magnetic field to be detected by the detection unit. Further, this noise increases as the distance between the detection unit and the magnetic field application unit get closer. Therefore, by placing the magnetic field application unit so as to be spaced apart from the detection unit by a predetermined distance apart to the extent that the detection of the magnetic field by the detection unit is not affected, the accuracy of the S/N ratio of the detection signal is improved. Consequently, the relative position between the detection unit and the magnetic field application unit changes, so that it is possible to suppress the generation of noise due to the change in the magnetic field from the magnetic field application unit to be detected by the detection unit.

In the configuration in which a magnetic field is applied to the elongated member in a direction along the extending direction of the elongated member, preferably, the magnetic field application unit includes a first magnetic field application unit for applying a magnetic field to the elongated member and a second magnetic field application unit for applying a magnetic field to the long size, the second magnetic field application unit being provided on an opposite side of the first magnetic field application unit with respect to the detection unit.

With this configuration, it is possible to place the magnetic field application units on both sides of the detection unit. Consequently, when detecting the change in the magnetic field extending in the extending direction of the elongated member by relatively moving the magnetic field application unit and the magnetic body, even if the magnetic field application unit and the elongated member are relatively moved in either the extending direction of the elongated member or the other direction thereof, the magnitude and orientation of the magnetization in the magnetic body can be rectified by the magnetic field application unit before the magnetic field is detected by the detection unit.

In the configuration in which a magnetic field is applied to the elongated member in a direction along the extending direction of the elongated member, preferably, the detection unit includes a detection coil configured to detect a change in the magnetic field in an extending direction of the magnetic body to generate the detection signal, the detection coil being provided so as to surround the magnetic body centering the elongated member in such a manner as to wind the magnetic body in the extending direction of the magnetic body.

With this configuration, since the detection coil generates a voltage due to the total magnetic flux in the detection coil or the change in the total magnetic flux, it is possible to easily detect the change in the magnetic field in the elongated member in the extending direction of the elongated member.

In this case, preferably, the detection coil includes a differential coil including two coil portions, the detection coil being configured to output each of the detection signals of the two coil portions generated by the magnetic field in the extending direction of the magnetic body.

With this configuration, by detecting the difference of the detection signals generated by one coil portion and the other coil portion of the differential coil due to damage or the like of the magnetic body, it is possible to more easily detect the local change of the state (presence or absence of damage or the like) of the magnetic body.

In the magnetic body inspection device according to the first aspect of the present invention, preferably, the magnetic body inspection device further includes:

a determination unit configured to determine a state of the magnetic body based on the detection signal output by the detection unit, wherein the determination unit is configured, when the detection signal output by the detection unit has exceeded one or a plurality of predetermined thresholds, to output one or a plurality of threshold signals indicating that the detection signal has exceeded the one or the plurality of predetermined thresholds to an outside.

With this configuration, the portion of the magnetic body where the state of the magnetic body (presence or absence of damage or the like) is uneven can be easily determined based on the threshold signal.

In this case, preferably, the determination unit is configured to count the number of times that the detection signal output by the detection unit has exceeded the one or the plurality of predetermined thresholds and, when the counted number of times has exceeded a predetermined number of times, output a signal indicating that the counted number of times has exceeded the predetermined number of times to an outside.

With such a configuration, it is possible to determine a condition of the magnetic body, such as, e.g., deterioration of the magnetic body, based on the numbers of damage or the like.

In the magnetic body inspection device according to the first aspect of the present invention, preferably, the detection unit includes an excitation coil for exiting a magnetization state of the magnetic body, the detection unit being configured to detect a magnetic field in the magnetic body in an extending direction of the magnetic body in which a magnetization state is excited by a magnetic field generated by an excitation current flowing through the excitation coil, or detect a change of the magnetic field in the magnetic body.

With this configuration, since the magnetization state at the portion of the magnetic body, such as, e.g., a damaged portion of the magnetic body, is excited by the excitation coil, it is possible to easily detect the change in the magnetic field or the change in the magnetic field in the extending the direction of the magnetic body from the portion of the magnetic body, such as, e.g., the damaged portion of the magnetic body. In particular, in the case of applying an excitation that changes with time in the magnetization state of the magnetic body by flowing an AC current through the excitation coil, the magnetic field in the magnetic body T also changes. Therefore, without relatively moving the magnetic body and the detection unit, it is possible to change and detect the magnetic field to be detected by the detection unit.

In the magnetic body inspection device according to the first aspect of the present invention, preferably, the magnetic field to be applied to the magnetic body by the magnetic field application unit is greater than a magnetic field generated by the excitation coil to excite the magnetization state of the magnetic body.

Here, the magnitude and orientation of the magnetization in the magnetic body have been rectified in the extending direction of the magnetic body by the magnetic field larger than the magnetic field applied by the magnetic field application unit in advance. Therefore, in the region of the magnetic body where there is no damage or the like, the change in the magnetic field when excited by the excitation coil is uniform. However, in the region where there is damage or the like in the magnetic body, the change in the magnetic field when excited is not uniform, as compared with the region where there is no damage or the like. Therefore, in the determination of the state of the magnetic body, the magnetic field required to excite the magnetization state in the extending direction of the magnetic body is sufficiently large for the detection even if it is smaller than the magnetic field applied to perform the magnetization rectification. That is, it is possible to reduce the magnitude of the magnetic field required to excite the magnetization state, as compared with the case in which the magnitude and orientation of the magnetization have not been rectified.

In the magnetic body inspection device according to the first aspect of the present invention, preferably, the detection unit is configured to detect the magnetic field in the magnetic body in the extending direction of the magnetic body or the change in the magnetic field at a detection position of the detection unit by relatively moving the magnetic body with respect to the detection unit in an extending direction of the magnetic body.

With this configuration, the portion of the magnetic body where the magnetic field in the magnetic body is detected by the detection unit changes with the relative movement. Therefore, by comparing the portion where there is damage or the like with the portion where there is no damage or the like, it is possible to easily detect damage or the like.

In the magnetic body inspection device according to the first aspect of the present invention, preferably, the the detection unit includes at least one magnetic sensor element that detects the magnetic field in the magnetic body or the change in the magnetic field.

With this configuration, unlike a detection unit including a coil inside of which a magnetic body is made to pass through, the limitation of the size of the magnetic body and/or the installation state thereof is relaxed, so the range of applications can be expanded.

In the magnetic body inspection device according to the first aspect of the present invention, preferably, the magnetic body includes a cable for moving at least one of an X-ray irradiation unit for irradiating a subject with X-rays and an X-ray detection unit for detecting X-rays transmitted through the subject, the X-ray irradiation unit and the X-ray detection unit being provided to an X-ray imaging apparatus so as to be movable relative to the subject, and the detection unit is configured to detect the magnetic field in the cable in an extending direction of the cable.

With this configuration, it is possible to easily determine the state (presence or absence of damage or the like) of the cable used in the X-ray imaging apparatus.

The magnetic body inspection method according to the second aspect of the present invention includes:

a step of rectifying magnitude and orientation of magnetization in a magnetic body by applying a magnetic field to a magnetic body to be inspected in advance by a magnetic field application unit including magnets arranged so that pole faces of the same polarity are opposed to each other on both sides of the magnetic body; and a step of detecting a magnetic field in the magnetic body to which the magnetic field has been applied or a change in the magnetic field in the magnetic body and outputting a detection signal based on the detected magnetic field in the magnetic body or the detected change in the magnetic field of the magnetic body.

In the magnetic body inspection method according to the second aspect of the present invention, as described above, a step of rectifying magnitude and orientation of magnetization in a magnetic body by applying a magnetic field in advance to the magnetic body by a magnetic field application unit including magnets arranged so that pole faces of the same polarity are opposed to each other on both sides of the magnetic body to be inspected, is provided. With this, the magnetic field is applied to the magnetic body in advance. Therefore, the magnitude and orientation of the magnetization in the portion of the magnetic body where there is no damage or the like are generally rectified. On the other hand, the magnitude and orientation of the magnetization in the portion of the magnetic body where there is damage or the like are not rectified. As a result, the detection signal output from the detection unit differs between the portion where there is damage or the like and the portion where there is no damage or the like. Therefore, it is possible to provide a magnetic body inspection method capable of easily determining the state of the magnetic body (presence or absence of damage or the like). Further, it becomes possible to rectify the magnitude and orientation of the magnetization in the magnetic body by applying a magnetic field from both sides of the magnetic body. Therefore, as compared with the case in which a magnetic field is applied from one side of the magnetic body, it is possible to provide a magnetic body inspection method capable of efficiently rectify the magnitude and orientation of the magnetization in the magnetic body.

Effects of the Invention

According to the present invention, as described above, it is possible to provide a magnetic body inspection device and a magnetic body inspection method capable of easily determining the state of the magnetic body (presence or absence of damage or the like).

BRIEF DESCRIPTION OF THE DRAWINGS

FIG. 5 shows a schematic diagram (A) and a schematic diagram (B) for explaining an application orientation of a magnetic field of a magnetic field application unit according to the first embodiment.

FIG. 8 shows a schematic diagram for explaining magnitude and orientation of magnetization in a steel wire cable according to a first comparative example.

FIG. 9 shows a graph (A) showing a value of a detection signal of a magnetic body according to a first comparative example and a graph (B) showing a value of a detection signal of a magnetic body according to the first embodiment.

FIG. 11 shows a schematic diagram (A) and a schematic diagram (B) for explaining an application orientation of a magnetic field at the time of performing magnetization rectification according to the first embodiment and a second comparative example, respectively.

FIG. 12 shows a graph (A) and a graph (B) of values of a detection signal of a magnetic body according to the first embodiment and a second comparative example, respectively.

FIG. 13 shows a block diagram showing an electronic circuit unit according to a second embodiment.

FIG. 14 shows a schematic diagram (A) and a schematic diagram (B) for explaining an excitation coil and a magnetic sensor element according to a third embodiment.

FIG. 16 shows a schematic diagram (A) to a schematic diagram (C) for explaining a magnetic field application unit according to a first modification.

FIG. 17 shows a schematic diagram (A) and a schematic diagram (B) for explaining a magnetic field application unit according to a second modification.

FIG. 21 shows a schematic diagram (A) and a schematic diagram (B) for explaining a detection coil according to a sixth modification.

FIG. 22 shows a schematic view (A) to a schematic view (C) for explaining an X-ray irradiator according to a seventh modification.

EMBODIMENTS FOR CARRYING OUT THE INVENTION

Hereinafter, some embodiments in which the present invention is embodied will be described with reference to the attached drawings.

First Embodiment

First, referring to FIG. 1 to FIG. 9, the configuration of a magnetic body inspection device 100 according to a first embodiment will be described. In the first embodiment, an example will be described in which a magnetic body inspection device 100 is used to inspect a steel wire cable W built in a mobile X-ray imaging apparatus (round-trip vehicle) 900.

Figure 1:
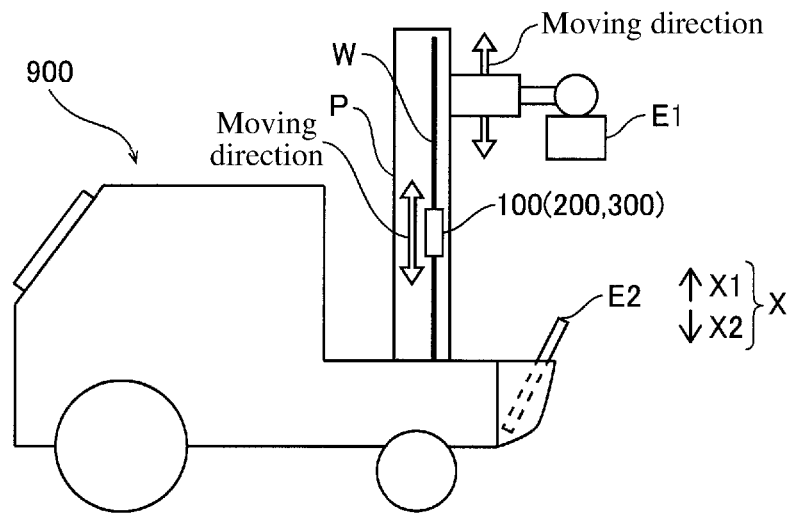
FIG. 1 shows a diagram illustrating an overall configuration of a mobile fluoroscopic device provided with a magnetic body inspection device according to a first embodiment.

As shown in FIG. 1, the mobile X-ray imaging apparatus 900 is provided with an X-ray irradiation unit E1 configured to be movable vertically (in the X-direction) with respect to a column P and a portable X-ray detection unit E2 and is configured to be movable by wheels. The X-ray irradiation unit E1 irradiates a subject with X-rays. The X-ray detection unit E2 detects X-rays transmitted through the subject and receives an X-ray image. The X-ray irradiation unit E1 and the X-ray detection unit E2 are composed of, for example, an X-tube and a flat panel detector (FPD), respectively. A steel wire cable W for pulling and supporting the X-ray irradiation unit E1 and a magnetic body inspection device 100 configured to be movable in the vertical direction (in the X-direction) along which the steel wire cable W extends are built in the column P. Note that the steel wire cable W is an example of the "magnetic body", the "elongated member" and the "cable" recited in claims. Also note that the X-direction is an example of the "extending direction of the magnetic body", the "extending direction of the elongated member", and the "extending direction of the elongated member" recited in claims.

The steel wire cable W is a magnetic body formed by braiding (e.g., strand-braiding) wire materials with magnetism and composed of an elongated member that extends in the X-direction. Although not shown, the steel wire cable W passes through mechanisms such as pulleys when moving the X-ray irradiation unit E1, and stresses are applied to the steel wire cable by the pulleys or the like. In order to prevent the steel wire cable W from being severed due to deterioration to fall the X-ray irradiation unit E, it is required to regularly monitor the state (presence or absence of damage or the like) of the steel wire cable and replace the degraded steel wire cable W at an early stage.

(Configuration of Magnetic Body Inspection Device)

Figure 3:
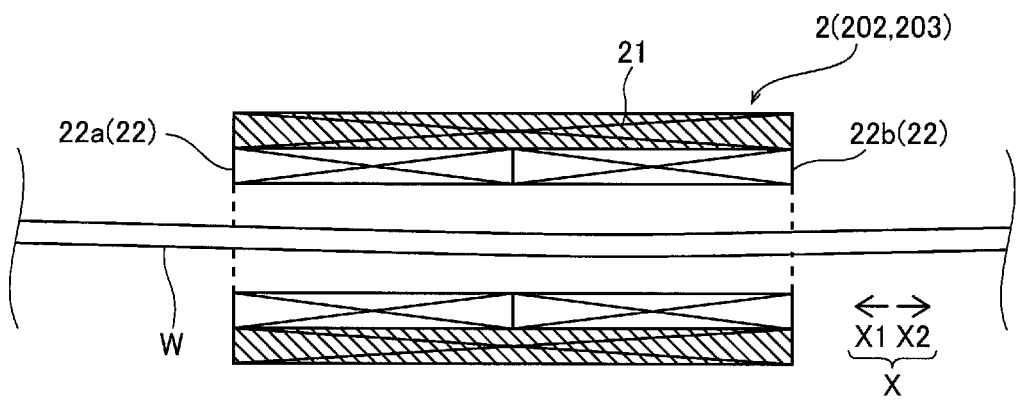
FIG. 3 shows a schematic diagram for explaining an excitation coil and a detection coil according to the first embodiment.
Figure 4:
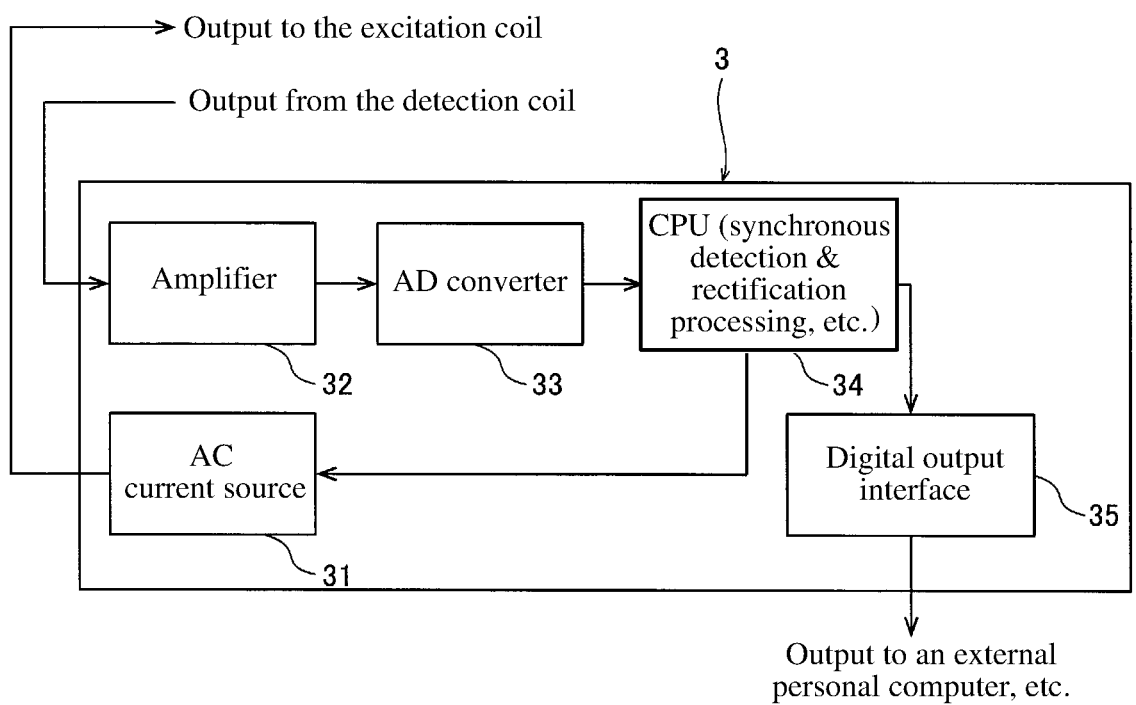
FIG. 4 shows a block diagram showing an electronic circuit unit according to the first embodiment.

Next, referring to FIG. 2 to FIG. 4, the configuration of the magnetic body inspection device 100 according to the first embodiment will be described.

Figure 2:
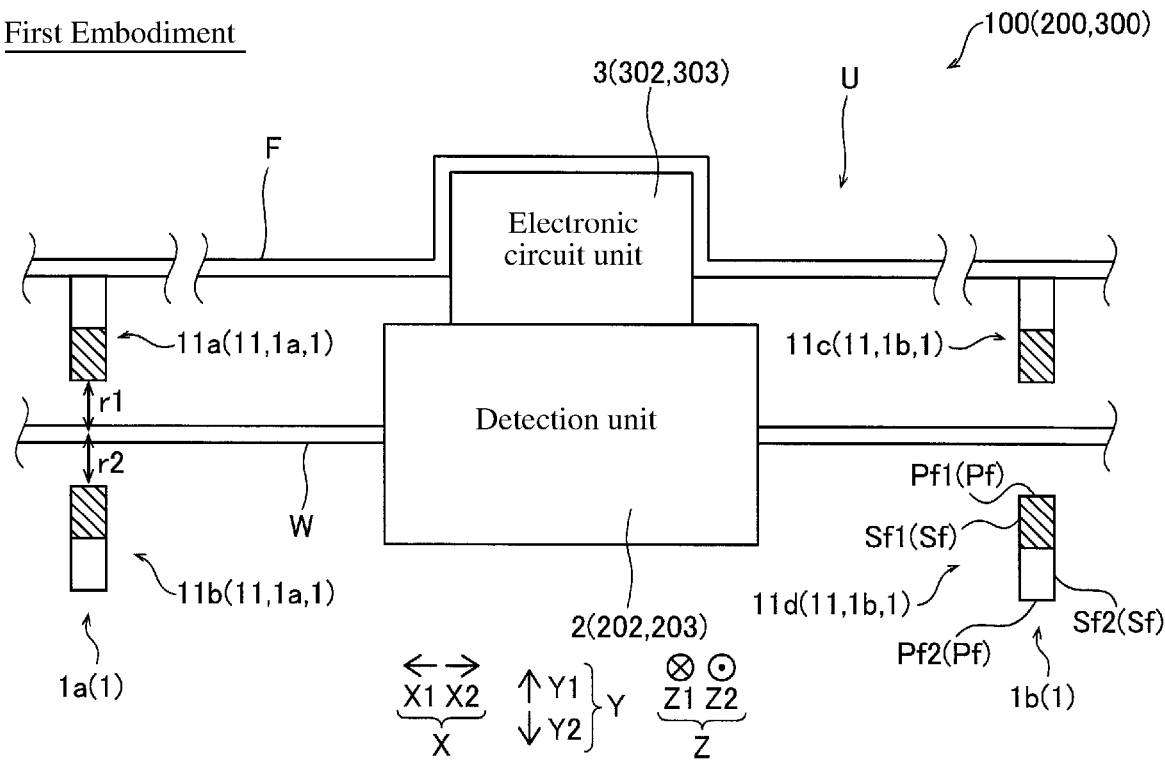
FIG. 2 shows a block diagram showing an entire configuration of the magnetic body inspection device according to the first embodiment.

As shown in FIG. 2, the magnetic body inspection device 100 is provided with a magnetic field application unit 1 for applying a magnetic field to a steel wire cable W, a detection unit 2 for outputting a detection signal based on a magnetic field of the steel wire cable W to which a magnetic field has been applied or the change in the magnetic field, and an electronic circuit unit 3 for determining the state of the steel wire cable W. Further, the magnetic field application unit 1, the detection unit 2, and the electronic circuit unit 3 are provided on the frame F, and is configured as an inspection unit U. The magnetic body inspection device 100 is provided with a driver (not shown) and a drive unit (not shown) that allows the inspection unit U to be moved relative to the steel wire cable W. Note that the Y-direction and the Z-direction are two directions perpendicular in a plane perpendicular to the extending direction of the steel wire cable W. Note that the electronic circuit unit 3 is an example of the "determination unit" recited in claims.

The magnetic field application unit 1 is configured to rectify the magnitude and orientation of the magnetization in the steel wire cable W by applying a magnetic field to the steel wire cable W to be inspected in advance. In this embodiment, the magnetic field application unit 1 includes magnets 11 arranged so that the pole faces Pf of the same polarity are opposed to each other on both sides (Y1-side and Y2-side) of the steel wire cable W. Specifically, a pair of magnets 11 is provided so as to sandwich the steel wire cable W with the pole faces of one of the same polarity of the magnets 11 not opposed to each other and the other pole faces opposed to each other. In the example shown in FIG. 2, the magnets 11 are arranged so that the N poles are opposed to each other. Note that in the example shown in FIG. 2, for convenience, the N pole of the magnet 11 is illustrated with hatching of diagonal lines. Further, the S pole of the magnet 11 is illustrated without hatching diagonal lines. In this embodiment, it is assumed that the pole face Pf of the N pole of the magnet 11 is denoted as a pole face Pf1 and the pole face Pf2 of the S pole is denoted as a pole face Pf2. Further, of the magnets 11, the side surface portion other than the magnetic poles is denoted as a side surface portion Sf other than the magnetic pole. Also, of the side surface portions Sf other than the magnetic poles, the N-pole side is denoted as a side surface portion Sf1 other than the magnetic poles and the S-pole side is denoted as a side surface portion Sf2 other than the magnetic poles.

Further, the magnetic field application unit 1 is provided at a position spaced apart from the detection unit 2 by a predetermined distance in the X-direction. Specifically, due to the deflection of the steel wire cable W and/or the rattling of the frame F fixing the magnetic field application unit 1 and the detection unit 2, the relative positional relation between the magnetic field application unit 1 and the detection unit 2 with respect to the steel wire cable W changes. When the relative positional relation between the magnetic field application unit 1 and the detection unit 2 with respect to the steel wire cable W changes, the magnetic field from the magnetic field application unit 1 to be detected by the detection unit 2 changes. The change of the magnetic field from the magnetic field application unit 1 that the detection unit 2 detects becomes a cause of generating noise in the magnetic field to be detected by the detection unit 2. Therefore, the magnetic field application unit 1 is provided at a position spaced apart by a predetermined distance to the extent that the effect of the change in the magnetic field on the detection unit 2 does not become an issue.

The magnetic field application unit 1 includes a first magnetic field application unit 1a for applying a magnetic field to the steel wire cable W and a second magnetic field application unit 1b for applying a magnetic field to the steel wire cable W. The second magnetic field application unit 1b is provided on the opposite side (X2-side) of the first magnetic field application unit 1a of the detection unit 2 in the X-direction. The first magnetic field application unit 1a and the second magnetic field application unit 1b each are fixed to the frame F.

The first magnetic field application unit 1a includes a pair of magnets 11a and 11b. The second magnetic field application unit 1b includes a pair of magnets 12a and 12b. The magnets 11a, 11b, 12a and 12b each are constituted by, for example, a permanent magnet. The magnitude of the magnetic field to be applied by the magnetic field application unit 1 is set to the magnitude capable of substantially uniformly rectifying the magnitude and orientation of the magnetization in the steel wire cable W (in a portion where there is no damage or the like).

In the example shown in FIG. 2, the pole faces Pf of the pair of magnets 11 facing each other in the first magnetic field application unit 1a and the pole faces Pf of the pair of magnets 11 facing each other in the second magnetic field application unit 1b each are the same in polarity.

The magnetic field to be applied to the magnetic body by the magnetic field application unit 1 is set to be larger than the magnetic field to be generated by the excitation coil 21 (described later) to excite the magnetization state of the steel wire cable W. Specifically, the magnetic field to be applied by the magnetic field application unit 1 is required to be set to the magnitude capable of rectifying the magnitude and orientation of the magnetization in the steel wire cable W substantially in the X-direction. On the other hand, the magnetic field required to excite the magnetization in the steel wire cable W by the excitation coil 21 can be set to be smaller than the magnetic field to be applied from the magnetic field application unit 1 to rectify (align) the magnitude and orientation of the magnetization in the steel wire cable W. The details will be described later.

The detection unit 2 is configured to output a detection signal based on the magnetic field of the steel wire cable W to which the magnetic field has been applied by the magnetic field application unit 1 or the change in the magnetic field. Specifically, the detection unit 2 includes the excitation coil 21 and the detection coil 22 as shown in FIG. 3. The excitation coil 21 and the detection coil 22 each are a coil including a conductive portion wound a plurality of times along the longitudinal direction and formed in a cylindrical shape along the X-direction, centering the extending direction of the steel wire cable W, which is a magnetic body composed of an elongated member. Therefore, the surface formed by the wound conductor is substantially perpendicular to the extending direction of the steel wire cable W, and the steel wire cable W passes through the inside of the coil. Further, the detection coil 22 is provided inside the excitation coil 21. The detailed configuration in which the detection unit 2 determines the state of the steel wire cable W will be described later.

The electronic circuit unit 3 is configured to determine the state of the steel wire cable W based on the detection signal output by the detection unit 2. Specifically, the electronic circuit unit 3 includes, as shown in FIG. 4, an AC power source 31, an amplifier 32, an AD converter 33, a CPU (Central Processing Unit) 34, and a digital output interface 35.

The AC power source 31 flows (outputs) an AC current to the excitation coil 21. The amplifier 32 amplifies the detection signal (the current based on the magnitude of the magnetic field in the steel wire cable W) output from the detection coil 22, and outputs it to the AD converter 33. The AD converter 33 converts the analogue detection signal amplified by the amplifier 32 into a digital detection signal. The CPU 34 performs a synchronous detection rectifier process for performing a process of removing the AC current component from the detection signal output from the AD converter 33 and converting it to a signal (DC level signal) corresponding to the change in the absolute value of the detection signal. The CPU 34 outputs an alarm signal when the detection signal has exceeded a predetermined threshold Th to be described later. Further, the CPU 34 controls the current output from the AC power source 31. The CPU 34 has a function for determining the size of damage or the like. The digital output interface 35 is connected to an external personal computer (not shown), etc., and outputs digital data, such as, e.g., a processed detection signal and a warning signal, to an external personal computer, etc. The external personal computer stores the magnitude of the input signal in a memory, display a graph showing the magnitude of the signal with time, and control the moving velocity of the detection unit 2 (integrally configured frame F) with respect to the steel wire cable W via the CPU 34.

The electronic circuit unit 3 is configured, when the detection signal output from the detection coil 22 (detection unit 2) has exceeded a first threshold, to output a first threshold signal indicating that the detection signal has exceeded the first threshold Th1 to the outside, and is configured, when the detection signal output from the detection unit 2 has exceeded the second threshold Th2, to output a second threshold signal indicating that the detection signal has exceeded the second threshold Th2 to the outside.

(Configuration To rectify Magnitude And Orientation of Magnetization In Magnetic Body)

Next, referring to FIG. 5, the configuration for rectifying the magnitude and orientation of the magnetization in the steel wire cable W by the magnetic field application unit 1 in the first embodiment will be described. (A) in FIG. 5 shows a schematic view of the magnetic body inspection device 100 as viewed from the Z-direction. (B) in FIG. 5 shows an enlarged schematic view of the vicinity of the magnetic field application unit 1 (the first magnetic field application unit 1a).

In the example shown in (A) of FIG. 5, in a case in which the inspection unit U is moved in the X1-direction to thereby relatively move the magnetic field application unit 1 and the detection unit 2 and the steel wire cable W provided in the inspection unit U, a magnetic field is preliminarily applied by the first magnetic field application unit 1a (the magnets 11a and 11b) to the portion of the steel wire cable W to be inspected by the detection unit U, so that the magnitude and orientation of the portion of the steel wire cable W is rectified. Further, in a case in which the inspection unit U is moved in the X2-direction to thereby relatively move the magnetic field application unit 1 and the detection unit 2 and the steel wire cable W provided in the inspection unit U, a magnetic field is preliminarily applied by the second magnetic field application unit 1b (the magnets 11c and 11d) to the portion of the steel wire cable W to be inspected by the detection unit, so that the magnitude and orientation of the portion of the steel wire cable W is rectified. Therefore, even in cases where the relative movement is performed in either direction, the magnetic field application unit 1 can rectify the magnitude and orientation of the magnetization in the steel wire cable W by applying a magnetic field of the steel wire cable W in advance before being detected by the detection unit 2.

As shown in (B) of FIG. 5, a pair of magnets 11 (magnet 11a and 11b) is configured to apply a magnetic field to the steel wire cable W from the short-axis direction (Y-direction) of the steel wire cable W. Specifically, a pair of magnets 11 (magnets 11a and 11b) is configured to primarily apply a magnetic field to the steel wire cable W in a direction along the X-direction. In the example shown in (B) of FIG. 5, the orientation of the magnetic field emitted from the magnet 11 is illustrated by a broken line 13

In the first embodiment, as shown in (B) of FIG. 5, the magnets 11a and 11b are arranged so as to be opposed to each other across the steel wire cable W. Therefore, the magnetic field applied from the magnet 11a and the magnetic field applied from the magnet 11b collide at a predetermined position. Therefore, the magnetic fields applied from the respective magnets 11 cancel each other at the predetermined position. Consequently, the pair of magnets 11 (magnet 11a and 11b) generates a region 14 for canceling magnetic fields in the steel wire cable W.

In the first embodiment, the pair of magnets 11 (magnet 11a and 11b) is arranged such that the region 14 for canceling magnetic fields is formed at a position where the steel wire cable W passes through the region 14 for canceling magnetic fields. Therefore, when magnetic fields are applied to the steel wire cable W by the magnetic field application unit 1, the magnitude of the magnetic field applied in the Y-direction to the steel wire cable W becomes zero by the region 14 for canceling magnetic fields. In the example shown in FIG. 2, the magnet 11a and the magnet 11b having the same magnitude of the magnetic force are used. Therefore, the region 14 for canceling magnetic fields is formed at the position where the distance r1 from the magnet 11a and the distance r2 from the magnet 11b is equal. In cases where the magnet 11a and the magnet 11b are different in the magnitude of the magnetic force, the positions for placing the magnet 11a and the position for placing the magnet 11b are adjusted so that the region 14 for canceling magnetic fields is formed at the position where the steel wire cable W passes through.

Further, the magnetic field applied from the magnets 11 to the steel wire cable W is emitted from one of pole faces Pf1 (N pole) to the other pole face Pf2 (N pole). Therefore, as it advances away from the center of the pole face Pf, the orientation of the magnetic field becomes a curve including a direction along the extending direction (X direction) of the steel wire cable W. Therefore, as it advances away from the center of the magnet 11 (as the magnetic field application unit 1 moves along the steel wire cable W), a portion is generated in which the direction in which the magnetic field is applied is along the longitudinal direction (X-direction) of the steel wire cable W. Therefore, the pair of magnets 11 applies a magnetic field to the steel wire cable W to generate a magnetization rectification region 15 for rectifying the magnitude and orientation of the magnetization in the steel wire cable W. Specifically, the pair of magnets 11 generates a magnetization rectification region 15 for rectifying the magnitude and orientation of the magnetization in the steel wire cable W substantially in the X-direction when the steel wire cable W is moved. Note that the magnetization rectification region 15 is not always required to strictly rectify the magnetization in the steel wire cable W in the extending direction (X-direction) of the steel wire cable W. It is enough that the magnetization rectification region 15 is configured to rectify the magnetization so that the sum of the magnitude and orientation and the vector of the magnetization in the steel wire cable W faces approximately in the X direction by the magnetic fields applied by the pair of magnets 11.

Further, the pair of magnets 11 is configured to generate the magnetization rectification region 15 before and after the detection unit 2 and the region 14 for canceling magnetic fields. Specifically, as shown in (B) of FIG. 5, the magnetic fields applied from the magnets 11 are emitted symmetrically. Therefore, two magnetization rectification regions 15 (magnetization rectification regions 15a and 15b) are formed across the region 14 for canceling magnetic fields. The steel wire cable W is magnetically rectified by the magnetization rectification region 15 generated between the detection unit 2 and the region 14 for canceling magnetic fields. As a result, the noise when detecting in the detection unit 2 can be reduced by performing magnetization rectification by the magnetization rectification region 15 (the magnetization rectification region 15a in the example of (B) of FIG. 15). Note that "before and after the region 14 for canceling magnetic fields" denotes a longitudinal direction in the direction in which the magnetic field application unit 1 is relatively moved.

As shown in (B) of FIG. 5, it is considered that the pair of magnets 11 magnetizes the steel wire cable W in the direction along the X1-direction in the magnetization rectification region 15a, then cancels the magnetization in the steel wire cable W in the region 14 for canceling magnetic fields, and then magnetizes the steel wire cable W in the direction along the X2-direction in the magnetization rectification region 15b. That is, the first magnetic field application unit 1a is configured to invert the orientation of the magnetic field applied to the steel wire cable W across the region 14 for canceling magnetic fields in the magnetization rectification region 15. In the example shown in (B) of FIG. 5, the orientation of the magnetic field that the first magnetic field application unit 1a applies in the magnetization rectification region 15a is the X2-direction. Further, the magnitude of the magnetic field that the first magnetic field application unit 1a applies becomes larger as it approaches the region 14 for canceling magnetic fields. In the region 14 for canceling magnetic fields, of the magnetic fields applied by the first magnetic field application unit 1a, the magnitude of the magnetic field applied in the direction (X-direction) along the steel wire cable W becomes zero. In the magnetization rectification region 15b, the orientation of the magnetic field that the first magnetic field application unit 1a applies is the X1-direction. Further, the magnitude of the magnetic field that the first magnetic field application unit 1a applies becomes smaller as it goes away from the region 14 for canceling magnetic fields. Note that also in the pair of magnets 11 (magnet 11c and magnet 11d) in the second magnetic field application unit 1b, similarly to the pair of magnets 11 in the first magnetic field application unit 1a, it is configured to generate a magnetization rectification region 15 before and after the region 14 for canceling magnetic fields. Further, the second magnetic field application unit 1b, similarly to the first magnetic field application unit 1a, it is configured to invert the orientation of the magnetic field applied to the steel wire cable W across the region 14 for canceling magnetic fields in the magnetization rectification region 15.

(Configuration for Inspecting State of Magnetic Body)

Next, referring to FIG. 6 to FIG. 9, the configuration in which the detection unit 2 and the electronic circuit unit 3 according to the first embodiment inspect the state of the steel wire cable W will be described.

Figure 6:
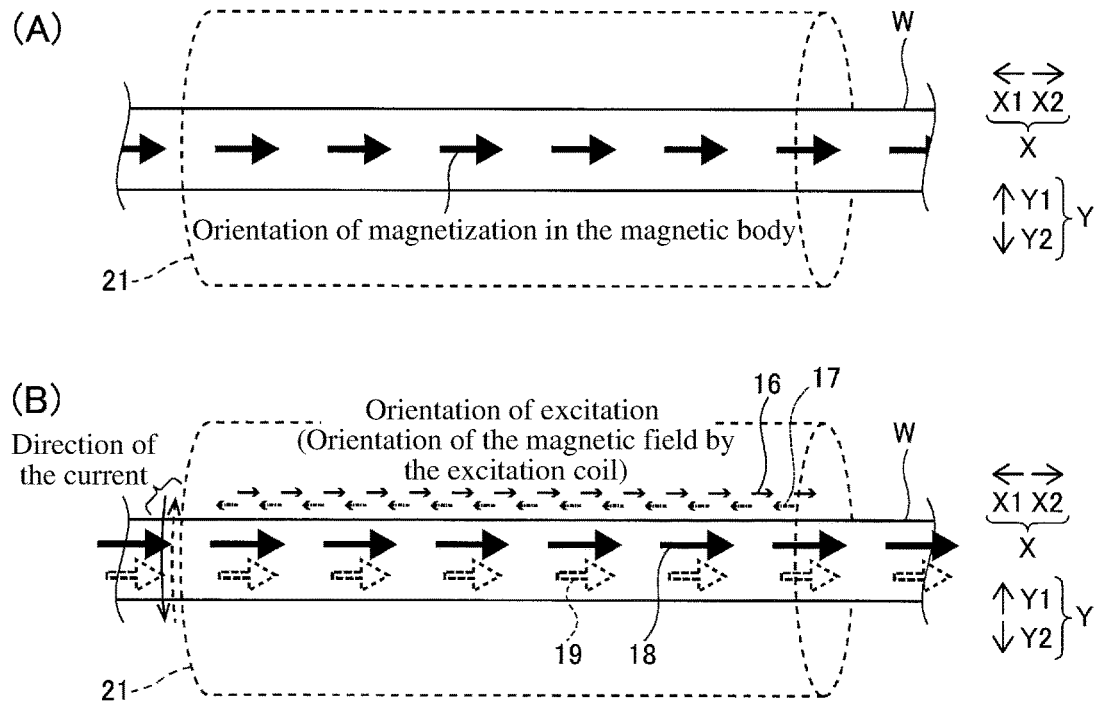
FIG. 6 shows a schematic diagram (A) and a schematic diagram (B) for explaining excitation of magnetization by an excitation coil according to the first embodiment.

(A) of FIG. 6 shows a schematic diagram of a steel wire cable W passing through the inside of the detection unit 2. (B) of FIG. 6 shows a schematic diagram when exciting the magnetization state of the steel wire cable W by the excitation coil 21 provided in the detection unit 2.

As shown in (A) of FIG. 6, the detection coil 22 is configured to detect the magnetic field resulting from the steel wire cable W passing through the inside of the detection coil 22. Specifically, the detection coil 22 is configured to generate a voltage by detecting a change in the magnetic field resulting from the steel wire cable W in the X-direction. Further, the detection coil 22 is configured to detect the change in the magnetic field in the steel wire cable W to which a magnetic field has been applied to the steel wire cable W by the magnetic field application unit 1, and is configured to output a voltage based on the detected change in the magnetic field of the steel wire cable W. Further, the detection coil 22 is arranged so that substantially all of the magnetic fields generated by the excitation coil 21 can be detected (inputted).

The detection coil 22 is a differential coil composed of a detection coil 22a and a direction coil 22b, which are two coil portions. Further, the detection coil 22 detects the change in the magnetic field in the steel wire cable W in the X-direction. The steel wire cable W is excited in the magnetization state by the magnetic field generated by the excitation current flowing through the excitation coil 21.

In the first embodiment, as shown in (B) of FIG. 6, it is configured such that when an excitation current is flowed through the excitation coil 21, inside the excitation coil 21, a magnetic field generated based on the excitation current is applied in a direction along the X-direction. With this, the excitation coil 21 excites the magnetization state in the steel wire cable W. Specifically, as shown in (B) of FIG. 6, when an AC current (excitation current) having a constant magnitude and a constant frequency is caused to flow in the excitation coil 21 from the outside, a magnetic field is applied to the steel wire cable W so as to oscillate in the X-direction which is the extending direction of the steel wire cable W (so as to appear the magnetic field in the X1-direction and the magnetic field in the X2-direction periodically). The orientation of the magnetic field (see the solid line 16 or the broken line 17) applied by the excitation coil 21 also changes in accordance with the orientation of the time-varying excitation current flowing through the excitation coil 21 (solid line or broken line).

Therefore, the magnitude (intensity) of the magnetization in the steel wire cable W changes due to the time-varying magnetic field, and the magnetic field emitted from the steel wire cable W also changes with time. As a result, the magnetic field by the same portion of the steel wire cable W temporally changes without changing the relative position between the steel wire cable W and the detection coil 22. Therefore, it is possible to determine the state of the steel wire cable W by the detection coil 22 that detects the change in the magnetic field. In the example shown in (B) of FIG. 6, for convenience, the magnetization in the steel wire cable W when excited in the X2-direction is illustrated by the solid arrow 18. Further, the magnetization in the steel wire cable W when excited in the X1-direction is illustrated by the dashed arrow 19. Further, in the example shown in (B) of FIG. 6, in order to facilitate the view of the change in the magnitude (intensity) of the magnetization in the steel wire cable W when excited is shown by shifting the position of the magnetization arrow 18 of the steel wire cable W and the position of the magnetization arrow 19 in the Y-direction. In actual, however, the magnetization position arrow 18 and the magnetization position arrow 19 of the steel wire cable W in the Y-direction match. Note that the magnetization in the steel wire cable W illustrated by the arrow 18 is increased as compared with the magnitude of the magnetic field before applying the magnetic field by the excitation coil 21 because the magnetic field in the X2-direction is applied by the excitation coil 21. Further, the magnetization in the steel wire cable W illustrated by the arrow 19 is decreased as compared with the magnitude of the magnetic field before the magnetic field is applied to the excitation coil 21 because the magnetic field is applied by the excitation coil 21 in the X1-direction.

Figure 7:
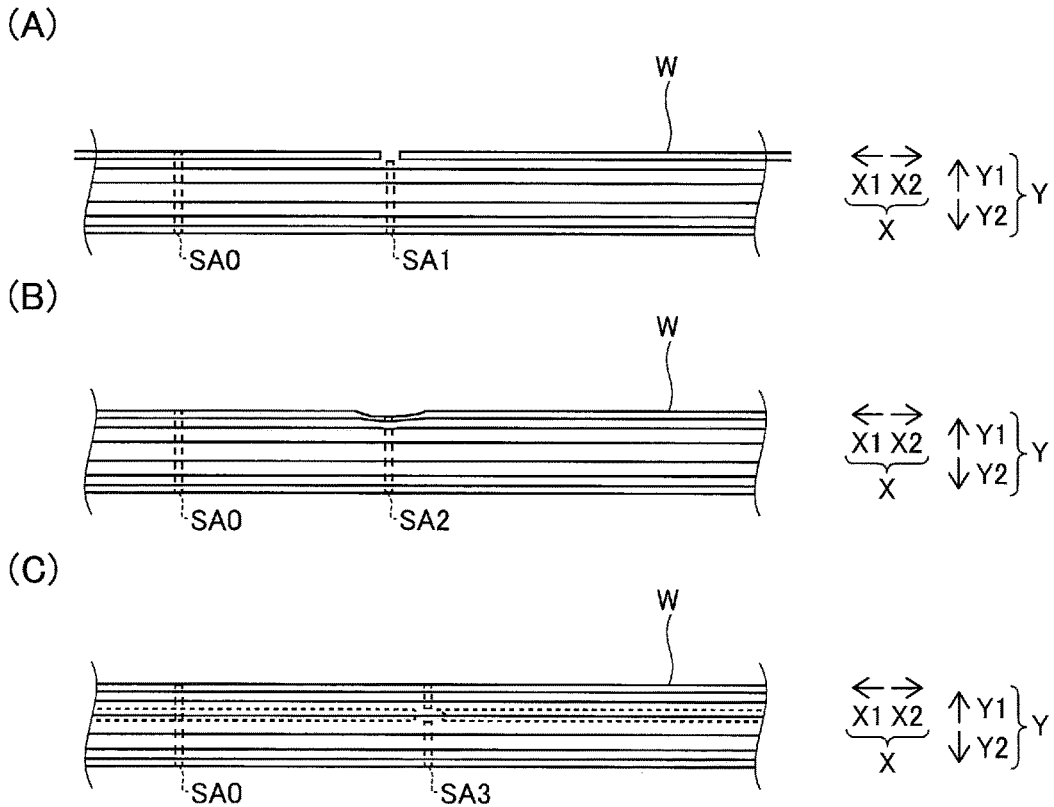
FIG. 7 shows a schematic diagram (A) to a schematic diagram (C) illustrating a case in which there is damage or the like in a steel wire cable.

FIG. 7 illustrates an example of a steel wire cable W having damage or the like. Note that in FIG. 7, the braiding of element wires is shown in a simplified manner. In the steel wire cable W shown in (A) of FIG. 7, the element wire on the surface portion is broken or disconnected. Further, the steel wire cable W shown in (B) of FIG. 7 is recessed on the surface portion by a scrape or a dent. Further, in the steel wire cable W shown in (C) of FIG. 7, an element wire breakage or disconnection occurred inside. Since the cross-sectional area SA1, SA2, SA3 of a position where there is damage or the like is smaller than the cross-sectional area SA0 of a portion where there is no damage or the like, the total magnetic flux (the value obtained by multiplying the permeability and the area to the magnetic field) in the steel wire cable W becomes smaller at a portion where there is damage or the like. As described above, in the portion where there is damage or the like, leakage of a magnetic field and reduction of the total magnetic flux occur, resulting in a change in the detected magnetic field.

Consequently, for example, since the value of the detected voltage of the detection coil 22a positioned at a location where there is damage or the like is reduced as compared with the detected voltage of the detection coil 22b, the value (detection signal) of the difference in the detected voltage by the differential coil (the entire detection coil 22) is increased. In other words, the detection signal at a portion where there is no damage or the like is almost zero and the detection signal at a portion where there is damage or the like has a value greater than zero. Therefore, in the differential coil, a clear signal (signal with a good S/N ratio) representing the presence of damage or the like is detected. With this, the electronic circuit unit 3 can detect the presence of damage or the like of the steel wire cable W based on the value of the difference in the detection signal. Further, since the larger the size of damage or the like (the magnitude of the reduction in the cross-sectional area) is, the larger the value of the detection signal becomes, when determining (evaluating) the size of damage or the like, when there is damage or the like that is larger than a certain degree, it is possible to automatically determine that the detected signal has exceeded a predetermined first threshold Th1 or second threshold Th2. Note that the damage or the like includes a change in the magnetic permeability due to rust or the like. Such a change similarly appears as a detection signal.

Comparative Example 1

Here, while comparing with a magnetic body inspection device according to a first comparative example similarly configured except that the magnetic field application unit 1 is not provided, the magnetization by the magnetic field application unit 1 of the magnetic body inspection device 100 will be described. Note that the comparison between the first comparative example and the embodiment is a comparison as to whether or not magnetization is performed.

In the magnetic body inspection device according to the first comparative example in which no magnetic field application unit 1 (not shown) is provided, a magnetic field is applied in the X-direction by the excitation coil 21. At this time, it is necessary to increase the magnetic field applied in the X-direction by the excitation coil 21 so that the detection signal (the magnitude of the magnetic field in the magnetic body including the temporal change of the magnetic field associated with the movement and excitation, etc.) detected at a uniform portion where there is no damage or the like is equal. Further, since the magnitude and orientation of the magnetization are not rectified (aligned) in advance, the magnetic field applied by the excitation coil 21 in the X-direction is required to be large enough to such a degree that the magnitude and orientation of the magnetization are aligned substantially in the X-direction.

Here, as shown in FIG. 8, before applying a magnetic field, in the steel wire cable W which is a magnetic body, at the time of the production, the magnitude and orientation of the magnetization are varied for each inner structure. Also, the magnitude and orientation of the magnetization change as an external force, such as, e.g., stress, is applied when passing through a mechanism, such as, e.g., a pulley. Therefore, even in a homogeneous portion where there is no damage or the like, the variation in the magnitude and orientation of the magnetization cannot be eliminated even if the magnitude and orientation of the magnetization is excited in the X-direction by the excitation coil 21. Therefore, noise is generated in the detection signal due to variations in the magnitude and orientation of the magnetization for each position of the steel wire cable W.

On the other hand, as shown in (A) of FIG. 6, in cases where the magnitude and orientation of the magnetization is rectified (aligned) by applying a magnetic field in advance by the magnetic field application unit 1, the magnetic field in the portion of the steel wire cable where there is no damage is substantially aligned in the X2-direction, and is detected as a substantially constant magnitude, which makes it possible to easily distinguish the signal from damage. Further, the magnitude and orientation of the magnetization in the steel wire cable W has been rectified in the X-direction by a large magnetic field in advance applied by the magnetic field application unit 1. Therefore, in the region where there is no damage or the like in the steel wire cable W, the change in the magnetic field when excited by the excitation coil 21 is uniform. However, in the region where there is damage or the like in the steel wire cable W, the change in the magnetic field when excited is not uniform as compared with the region where there is no damage or the like. Therefore, in determining the state of the steel wire cable W, the magnetic field required to excite the magnetization state in the X-direction is sufficiently large for the detection even if it is smaller than the magnetization applied to magnetize.

The graph of FIG. 9 shows the change in the magnetic field in the steel wire cable W according to the first comparative example and the first embodiment. The vertical axis of the graph corresponds to the magnitude of the detection signal, and the horizontal axis of the graph corresponds to the detection position (where the steel wire cable W is detected). Since the synchronous detection rectifier process is performed by the CPU 34, the effect of the temporal change in the magnetic field applied by the excitation coil 21 has been eliminated.

In the magnetic body inspection device according to the first comparative example without providing the magnetic field application unit 1, as shown in the graph of (A) of FIG. 9 without magnetization rectification, even in a portion where there is no damage or the like, noise due to variations in the magnitude and orientation of the magnetization is detected. Therefore, in the magnetic body inspection device according to the first comparative example, it is difficult for a non-expert without experience or knowledge (for example, how to pattern characteristic detection signals) to determine the presence or absence of damage or the like. In particular, in the case of determining based on only the magnitude of the signal by providing a threshold or the like, the noise may cause an erroneous determination.

On the other hand, in the magnetic body inspection device 100 according to the first embodiment in which the magnetic field application unit 1 is provided, as shown in the graph with magnetization rectification shown in (B) of FIG. 9, almost no noise is detected. Specifically, the magnitude of the noise is relatively small, resulting in a graph good in the S/N ratio. The detection signal clearly appears. Therefore, by magnetically rectifying the steel wire cable W by the magnetic field application unit 1, even in the determination by a non-expert and a threshold Th, it is possible to reduce the noise to the extent that no erroneous determination occurs. Note that in the graph after magnetization rectification shown in FIG. 9, it can be seen that the positive and negative inversion of the detection signal due to the movement of the position of a portion of the steel wire cable W where there is damage or the like from one side to the other side of the differential coil is clearly appeared.

(Magnetic Body Inspection Process)

Figure 10:
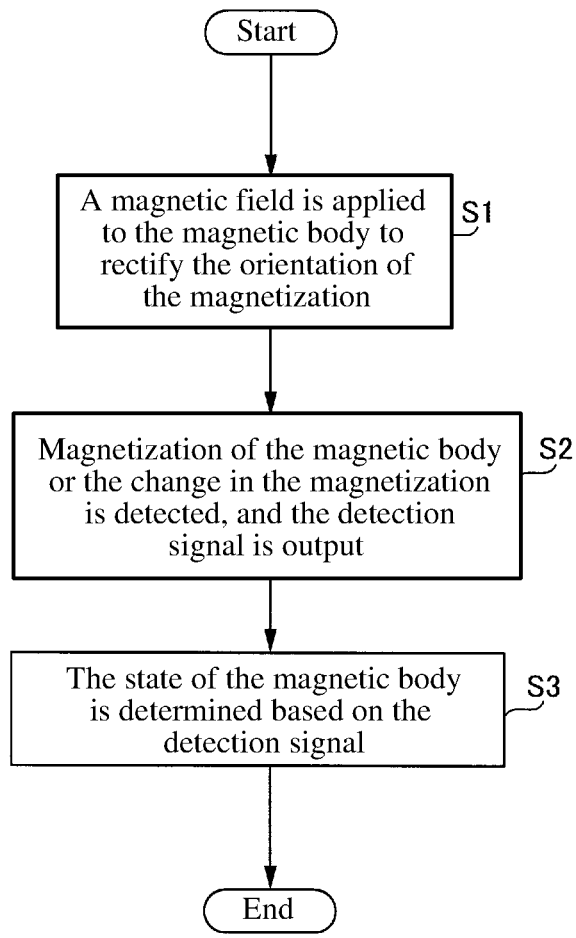
FIG. 10 shows a flowchart for explaining a process of inspecting a magnetic body according to the first embodiment.

Next, referring to FIG. 10, the flow of the process that the magnetic body inspection device 100 according to the first embodiment performs an inspection of a steel wire cable W will be described.

In Step S1, the magnetic field application unit 1 rectifies the magnitude and orientation of the magnetization in the steel wire cable W by applying a magnetic field to the steel wire cable W in advance by the magnets 11 arranged so that the pole faces Pf (Pf1) of the same polarity (N pole) are opposed to each other on both sides of the steel wire cable W. Thereafter, the process proceeds to Step S2.

In Step S2, the detection unit 2 detects the magnetic field of the steel wire cable W to which a magnetic field has been applied or the change in the magnetic field and outputs a detection signal based on the magnetic field of the detected steel wire cable W or the change in the magnetic field. Thereafter, the process proceeds to Step S3.

In Step S3, the electronic circuit unit 3 determines the state of the steel wire cable W based on the detection signal output by the detection unit 2 and terminates the process.

As described above, the magnetic body inspection method according to the first embodiment includes Step S1 of rectifying the magnitude and orientation of the magnetization in the steel wire cable W by applying a magnetic field in advance to the steel wire cable W by the magnetic field application unit 1 including the magnets 11 arranged such pole faces Pf (Pf1) of the same polarity (N pole) are opposed to each other on both sides of the steel wire cable W to be inspected, and Step S2 of detecting the magnetic field of the steel wire cable W to which a magnetic field has been applied or the change in the magnetic field and outputting a detection signal based on the detected magnetic field of the steel wire cable W or the change in the magnetic field.

Comparative Example 2

Now, referring to FIG. 11 and FIG. 12, the magnetization rectification of the steel wire cable W by the magnetic body inspection device according to a second comparative example in which one magnet 41 (see FIG. 11) of the magnetic field application unit 40 (see FIG. 11) is provided along the longitudinal axis direction of the steel wire cable W and the magnetization in the steel wire cable W by the magnetic field application unit 1 of the magnetic body inspection device 100 in this embodiment will be described. (A) of FIG. 11 shows the arrangement of the magnet 11 of the magnetic field application unit 1 in this embodiment. In the configuration shown in (A) of FIG. 11, the steel wire cable W passes the magnetization rectification region 15a, the region 14 for canceling magnetic fields, the magnetization rectification region 15b, and the detection unit 2 in the order of detection unit 2. The magnetic field received by the steel wire cable W from the magnet 11 is inverted from the X1-direction to the X2-direction before and after the region 14 for canceling magnetic fields. (B) of FIG. 11 shows the arrangement of the magnet 41 of the magnetic field application unit 40 according to the second comparative example. In the configuration shown in (B) of FIG. 11, although the orientation of the magnetic field received by the steel wire cable W varies slightly along the line of the magnetic field emitted from the magnet 41, the orientation of the magnetic field in the direction (X-direction) along the steel wire cable W does not change substantially. That is, in the configuration shown in (B) of FIG. 11, before and after the magnet 41, the orientation of the magnetic field applied to the steel wire cable W is not inverted. Further, there is no region 14 for canceling magnetic fields.

(A) of FIG. 12 is a schematic diagram of a graph 43 showing the waveform of the detection signal detected by the detection unit 2 according to this embodiment. (B) of FIG. 12 is a graph 44 showing the waveform of the detection signal detected by the detection unit 42 according to the second comparative example (see (B) of FIG. 11). In the graphs 43 and 44, the vertical axis denotes a signal intensity, and the horizontal axis denotes a detection position. Further, the region 45 and the region 46 in the graphs 43 and 44 represent a position where there is a disconnection in the wire element of the steel wire cable W. Note that the graphs 43 and 44 shown in (A) of FIG. 12 and (B) of FIG. 12 show experimental results obtained by actually detecting the detection signal of the same steel wire cable W by the configuration of (A) FIG. 11 and (B) of FIG. 11.

As shown in the graph 43, the detection signal of the steel wire cable W after being magnetically rectified by the magnetic field application unit 1 according to this embodiment shows a characteristic wave form in the region 45. Therefore, it is possible to easily grasp the position of the disconnection of the element wire of the steel wire cable W.

On the other hand, as shown in the graph 44, the detection signal of the steel wire cable W after being magnetically rectified by the magnetic field application unit 40 according to the second comparative example shows a characteristic waveform in the region 46. However, also other than the region 46, waveforms similar to the waveform of the disconnection portion are seen. Therefore, it is difficult to easily grasp the position of the wire breakage of the steel wire cable W. From these, as compared with the second comparative example in which the magnetic field is not abruptly inverted, by inverting the orientation of the magnetic field applied to the steel wire cable W, it was possible to obtain a knowledge that it is possible to perform accurate signal detection.

(Effects of First Embodiment)

In this first embodiment, the following effects can be obtained.

In the first embodiment, as described above, the magnetic body inspection device 100 is provided with: a magnetic field application unit 1 configured to rectify the magnitude and orientation of the magnetization in the steel wire cable W to be inspected in advance by applying a magnetic field to the steel wire cable W; and a detection unit 2 configured to output a detection signal based on the change in the magnetic field of the steel wire cable W to which magnetic field has been applied by the magnetic field application unit 1. The magnetic field application unit 1 includes magnets 11 arranged such that the pole faces Pf (Pf1) of the same polarity (N pole) are opposed to each other on both sides of the steel wire cable W. With this, the magnetic field is applied to the steel wire cable W in advance, so that the magnitude and orientation of the magnetization in the portion of the steel wire cable W where there is no damage or the like are substantially rectified. On the other hand, the magnitude and orientation of the magnetization in the portion of the steel wire cable W where there is damage or the like are not rectified. As a result, the detection signal output from the detection unit 2 differs between the portion where there is damage or the like and the portion where there is no damage or the like, which makes it possible to easily determine the state of the steel wire cable W (presence or absence of damage or the like). Further, it is possible to rectify the magnitude and orientation of the magnetization in the steel wire cable by applying the magnetic field from both sides of the steel wire cable W (from the Y1-direction and the Y2-direction). Thus, as compared with the case of applying a magnetic field from one side of the steel wire cable W, it is possible to efficiently rectify the magnitude and orientation of the magnetization in the steel wire cable W.

Further, in the first embodiment, as described above, the magnet 11 includes a pair of magnets provided so as to sandwich the steel wire cable W. The magnet 11 is configured to generate the region 14 for canceling the magnetic fields in the steel wire cable W by applying a magnetic field to the steel wire cable W and the magnetization rectification region 15 for rectifying the magnitude and orientation of the magnetization in the steel wire cable W by applying the magnetic field. With this, the region 14 for canceling magnetic fields in the steel wire cable W is generated. Thus, when detecting the state (presence or absence of damage or the like) of the steel wire cable W, it is possible to pass the steel wire cable W through the magnetization rectification region 15, the region 14 for canceling magnetic fields, the magnetization rectification region 15, and the detection unit 2 in this order. Therefore, by the region 14 for canceling magnetic fields, it becomes possible to suppress the generation of magnetic poles in the short axis direction (Y-direction) of the steel wire cable W. As a result, it is possible to suppress the steel wire cable W from being attracted to the magnetic field application unit 1 in the short axis direction (Y-direction) and also possible to perform the magnetization rectification of the steel wire cable W by the magnetization rectification region 15. Consequently, as compared with the case in which the magnetic field application unit 1 does not generate the region 14 for canceling magnetic fields, it is suppressed that the steel wire cable W is attracted to the magnetic field application unit 1 in the short axis direction (Y-direction). As a result, the magnetization rectification of the steel wire cable W can be performed without increasing the tension to be applied to the steel wire cable W.

Further, in the first embodiment, as described above, the magnetic field application unit 1 is configured to invert the orientation of the magnetic field to be applied to the steel wire cable W across the region 14 for canceling magnetic fields, in the magnetization rectification regions 15. Thus, even if the magnitude and orientation of the magnetization in the steel wire cable W before magnetization rectification are orientated in any direction, it becomes possible to pass the steel wire cable W through the magnetization rectification region 15*b*, the region 14 for canceling magnetic fields, and the magnetization rectification region 15*a* in this order. Therefore, it is possible easily and reliably to magnetically rectify the steel wire cable W. Further, the orientation of the magnetic field that the magnetic field application unit 1 emits is inverted before and after the region 14 for canceling magnetic fields. Consequently, as apparent from the findings described in the second comparative example, as compared with the case in which the direction of the magnetic field is not inverted, it is possible to detect the change in the magnetic field more accurately.

Further, in the first embodiment, as described above, the magnetic body is composed of a steel wire cable W, a pair of magnets 11 is configured to apply the magnetic field to the steel wire cable W mainly along the extending direction (X-direction) of the steel wire cable W. With this, even in a case where a pair of magnets 11 is arranged so as to sandwich the steel wire cable W, by applying a magnetic field to the steel wire cable W along the extending direction (X-direction) of the steel wire cable W, it is possible to rectify the magnitude and orientation of the magnetization in the steel wire cable W.

Further, in the first embodiment, as described above, the pair of magnets 11 (the magnets 11*a* and 11*b*, or the magnets 11*c* and 11*d*), one of pole faces Pf of the same polarity (S pole) of the respective magnets 11 are arranged so as not to be opposed to each other, and the other of pole faces Pf of the same polarity (N pole) of the respective magnets 11 are arranged so as to be opposed to each other. With this configuration, for example, even in the case of using a pair of rod-shaped magnets 11 each having pole faces Pf (Pf1 and Pf2) on both end faces, it is possible to arrange the pair of magnets along the short axis direction (Y-direction) of the steel wire cable W with the same polarities of the magnets 11 opposed to each other. Consequently, it becomes possible to apply a magnetic field to the steel wire cable W from the short axis direction of the steel wire cable W (from the Y-direction), so that it is possible to easily produce the region 14 for canceling magnetic fields and the magnetization rectification region 15.

Further, in the first embodiment, as described above, the magnetic field application unit 1 is provided at a position spaced apart from the detection unit 2 by a predetermined distance in the extending direction (X-direction) of the steel wire cable W. Here, when the relative position between the detection unit 2 and the magnetic field application unit 1 is changed, the magnetic field from the magnetic field application unit 1 to be detected by the detection unit 2 changes. The change in the magnetic field from the magnetic field application unit 1 to be detected by the detection unit 2 becomes a cause to generate noise in the magnetic field to be detected by the detection unit 2. This noise increases as the distance between the detection unit 2 and the magnetic field application unit 1 is close. For this reason, by arranging the magnetic field application unit 1 so as to be spaced apart by a predetermined distance to the extent that the detection of the magnetic field by the detection unit 2 is not affected, the accuracy of the S/N ratio of the detection signal is increased. Consequently, it is possible to suppress the generation of noise caused by the change in the magnetic field from the magnetic field application unit 1 to be detected by the detection unit 2 due to the change in the relative position between the detection unit 2 and the magnetic field application unit 1.

Further, in the first embodiment, as described above, the magnetic field application unit 1 includes a first magnetic field application unit 1*a* and a second magnetic field application unit 1*b*. The first magnetic field application unit 1*a* is configured to apply a magnetic field to the steel wire cable W. The second magnetic field application unit 1*b* is provided on a side opposite to the side of the first magnetic field application unit 1*a* of the detection unit 2 in the extending direction (X-direction) of the steel wire cable W and configured apply a magnetic field to the steel wire cable W. Thus, it is possible to arrange the magnetic field application unit 1 on both sides of the detection unit 2. Consequently, when detecting the change in the magnetic field of the steel wire cable W in the extending direction (X-direction) of the steel wire cable W by relatively moving the magnetic field application unit 1 and the steel wire cable W, even if the magnetic field application unit 1 and the steel wire cable W are relatively moved in any direction between one side (X1-direction) and the other side (X2-direction) of the extending direction (X-direction) of the steel wire cable W, it is possible to rectify the magnitude and orientation of the magnetization in the steel wire cable W by the magnetic field application unit 1 before the magnetic field is detected by the detection unit 2.

Further, in the first embodiment, as described above, the detection unit 2 includes the detection coil 22. The detection coil 22 surrounds the steel wire cable W centering the steel wire cable W, provided so as to wind along the extending direction of the steel wire cable W (X direction), and generates a detection signal by detecting the change in the magnetic field in the steel wire cable W in the extending direction (X direction) of the steel wire cable W. With this, the detection coil 22 generates a voltage by the total magnetic flux inside the detection coil 22 or the change in the total magnetic flux, so that it is possible to easily detect the change in the magnetic field in the steel wire cable W in the extending direction (X-direction) of the steel wire cable W Further, in the first embodiment, as described above, the detection coil 22 is configured to include a differential coil and output the respective detection signals generated by the two coil portions included in the differential coil by the magnetic field of the steel wire cable W in the extending direction (X-direction) of the steel wire cable W. With this, by detecting the difference in the detection signals caused by damage or the like of the steel wire cable W generated by one of the coil portions of the differential coil and the other coil portion thereof, it is possible to more easily detect the local change in the state (presence or absence of damage or the like) of the steel wire cable W.

Further, in the first embodiment, as described above, an electronic circuit unit 3 is further provided. The electronic circuit unit 3 is configured to determine the state of the steel wire cable W based on the detection signal output by the detection unit 2. The electronic circuit unit 3 is configured such that when the detection signal output by the detection unit 2 has exceeded the two predetermined thresholds Th (a first threshold Th1 and a second threshold Th2), two predetermined signals (a first threshold signal and a second threshold signal) indicating that the detection signal has exceeds the two predetermined thresholds Th (a first threshold Th1 and a second threshold Th2) are output. With this, it is possible to easily determine the portion where the state (presence or absence of damage or the like) of the steel wire cable W becomes uneven based on the threshold signals.

Further, in the first embodiment, as described above, the detection unit 2 is configured to further include the excitation coil 21 for exciting the magnetization state of the steel wire cable W and detect the magnetic field of the steel wire cable W in the extending direction (X-direction) in which the magnetization state is excited by the magnetic field generated by the excitation current flowing through the excitation coil 21 and the change in the magnetization state. With this, the excitation coil 21 excites the magnetization state of the damage or the like in the portion of the steel wire cable W, it is possible to easily detect the magnetic field in the steel wire cable W in the extending direction (X-direction) from the damage or the like or the change in the magnetic field. In particular, in the case of giving time-varying excitation to the magnetization in the steel wire cable W by flowing an AC current or the like through the excitation coil 21, the magnetic field of the steel wire cable W also changes over time. Therefore, without relatively moving the steel wire cable W and the detection unit 2, it is possible to change the magnetic field to be detected by the detection unit 2 and detect it.

Further, in the first embodiment, as described above, the magnetic field to be applied to the steel wire cable W by the magnetic field application unit 1 is greater than the magnetic field to be generated to excite the magnetization state of the steel wire cable W by the excitation coil 21. With this, as compared with the case in which the magnitude and orientation of the magnetization have not been rectified, it possible to reduce the magnitude of the magnetic field required to excite the magnetization state.

In the first embodiment, as described above, the magnetic body includes a steel wire cable W. The steel wire cable W is provided on the X-ray imaging apparatus 900 so as to be movable relative to a subject and is used to move at least one of the X-ray irradiation unit E1 for irradiating the subject with X-rays and the X-ray detection unit E2 for detecting X-rays transmitted through the subject. The detection unit 2 is configured to detect the magnetic field in the X-direction. With this, the state (presence or absence of damage or the like) of the steel wire cable W used in the X-ray imaging apparatus 900 can be easily determined.

Further, in the first embodiment, as described above, the magnetic body inspection method includes Step S1 of rectifying the magnitude and orientation of the magnetization in the steel wire cable W by applying a magnetic field in advance to the steel wire cable W by the magnetic field application unit 1 including the magnets 11 arranged such pole faces Pf (Pf1) of the same polarity (N pole) are opposed to each other on both sides of the steel wire cable W to be inspected, and Step S2 of detecting the magnetic field of the steel wire cable W to which a magnetic field has been applied or the change in the magnetic field and outputting a detection signal based on the detected magnetic field of the steel wire cable W or the change in the magnetic field. As a result, it is possible to provide a magnetic body inspection method capable of easily determining the state (presence or absence of damage or the like) of the steel wire cable W. Further, since it is possible to rectify the magnitude and orientation of the magnetization in the steel wire cable W by applying a magnetic field from both sides (Y1-direction and Y2-direction) of the steel wire cable W, it is possible to provide a magnetic body inspection method capable of efficiently rectifying the magnitude and orientation of the magnetization in the steel wire cable W, as compared with the case of applying a magnetic field from one side of the steel wire cable W.

Second Embodiment

Next, referring to FIG. 2 and FIG. 13, the configuration of a magnetic body inspection device 200 according to a second embodiment will be described. Unlike the first embodiment, in the magnetic body inspection device 200 according to the second embodiment, the excitation current to be supplied to the excitation coil 21 is a direct current that the excitation current does not change with time.

Specifically, magnetic body inspection device 200 includes an electronic circuit unit 302 provided in the inspection unit U. The electronic circuit unit 302 includes a DC power source 312, as shown in FIG. 13. The DC power source 312 flows a DC current that does not change with time (the value is constant) to the excitation coil 21. With this, in the excitation coil 21, a static magnetic field with a constant magnitude in the X-direction is generated.

Here, in the magnetic body inspection device 200 according to the second embodiment, the detection unit 202 (see FIG. 2) is configured to detect the change in the magnetic field of the steel wire cable W in the X-direction at the detection position of the detection unit 202 by relatively moving the steel wire cable W at a constant speed which is substantially constant in the X-direction with respect to the detection unit 2.

Specifically, at the time of the inspection, as the position of the steel wire cable W to be detected by the detection coil 22 of the detection unit 202 changes with time, the magnetic field detected by the detection coil 22 also changes with time. When the detection coil 22 is passing through a portion of the steel wire cable W where there is no damage or the like, the magnitude of the magnetic field in the detection coil 22 in the X-direction is substantially constant. Therefore, the detection signal is also constant. On the other hand, when the detection coil 22 is positioned at a position of the steel wire cable W where there is damage or the like, the detection signal changes because the magnitude of the magnetic field at the detection position changes with time. This makes it possible to determine the state (presence or absence of damage or the like) of the steel wire cable W.

The rest of the configuration of the second embodiment is the same as that of the first embodiment.

(Effects of Second Embodiment)

In the second embodiment, as described above, the detection unit 202 is configured to detect the change in the magnetic field of the steel wire cable W in the X-direction at the detection position of the detection unit 202 by relatively moving the steel wire cable W at a constant speed which is substantially constant in the X-direction with respect to the detection unit 2. With this, since the portion of the steel wire cable W where the magnetic field is detected by the detection unit 202 changes in accordance with the relative movement, by comparing with a portion where there is damage or the like with a portion where there is no damage or the like, it is possible to easily detect damage or the like. Further, by relatively moving the steel wire cable W and the detection unit 2 at a constant speed, the detection signal becomes substantially constant at the position where there is no damage or the like and the detection signal is output at the position where there is damage or the like.

Therefore, it is easy to determine the state of the steel wire cable W, such as, e.g., the presence or absence of damage or the like.

The other effects of the second embodiment are the same as those of the first embodiment.

Third Embodiment

Next, referring to FIG. 2, FIG. 14, and FIG. 15, the configuration of a magnetic body inspection device 300 (see FIG. 3) according to the third embodiment will be described. In the magnetic body inspection device 300 according to the third embodiment, unlike the first embodiment, magnetic sensor elements 23 for detecting the magnetic field of the steel wire cable W are provided.

Specifically, the magnetic body inspection device 300 is provided with a detection unit 203 (see FIG. 2) and an electronic circuit unit 303 (see FIG. 2) provided to the inspection unit U. Further, as shown in (A) of FIG. 14, the detection unit 203 includes a plurality of magnetic sensor elements 23 (12 magnetic sensor element symmetrically to the axis of the steel wire cable W) arranged so as to circumferentially surround the steel wire cable W in a plane perpendicular to the longitudinal direction of the steel wire cable W. The magnetic sensor element 23 is configured by, for example, any one of or a combination of a coil, a coil with an excitation coil, a differential coil with an excitation coil, a Hall element, a magneto-impedance element, and a magnetoresistive element. When a coil is used, the static magnetic field cannot be detected, so the measurement must be performed while moving the magnetic body, whereas when the excitation coil 21 is used together, the measurement can be performed even when the magnetic body to be measured is in a stationary state. Further, in the case of using a Hall element, a magnetic impedance element, or a magnetoresistive element, since these elements themselves can measure the static magnetic field, even when the magnetic body of the measurement target is in a stationary state, it is possible to perform the measurement. Note that a plurality of magnetic sensor elements 23 may be arranged at a plurality of locations so as to detect the magnitude in the change of the magnetic field in two or three directions. The magnetic sensor element 23 can be configured to detect not only the magnitude in the change of the magnetic field but also the magnitude of the magnetic field.

Figure 15:
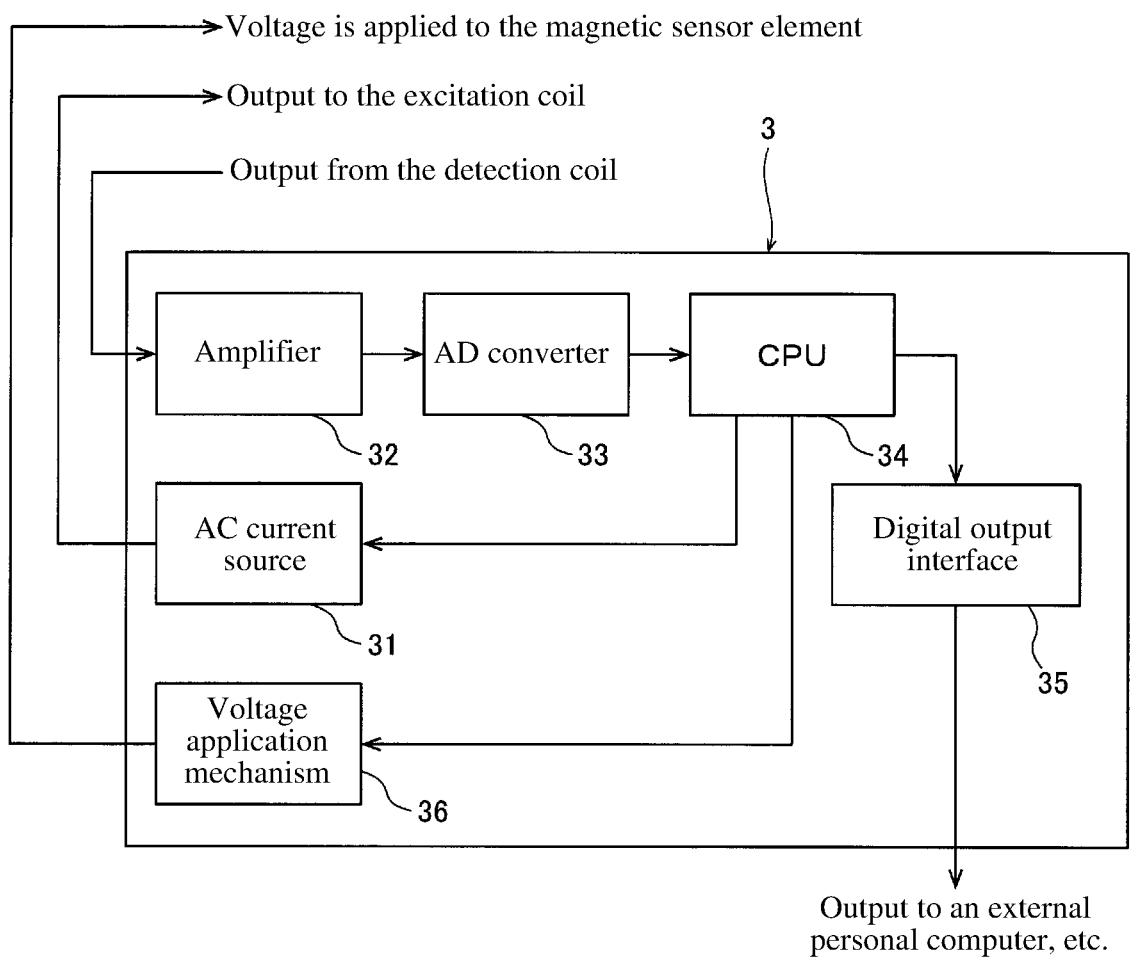
FIG. 15 shows a block diagram showing an electronic circuit unit according to the third embodiment.

Further, as shown in FIG. 15, the electronic circuit unit 303 includes a voltage application mechanism 36 for applying a voltage to the magnetic sensor element 23. The electronic circuit unit 303 is configured to electrically control the magnetic sensor element 23 and process the electrical signal from the detection unit 203 to output it as a detection signal.

The rest of the configuration of the third embodiment is the same as that of the first embodiment.

(Effects of Third Embodiment)

In the third embodiment, as described above, with respect to the steel wire cable W after the magnetic field is applied in the X-direction by the magnetic field application unit 1, a detection unit 202 for detecting the magnetic field or the change in the magnetic field and outputting a detection signal based on the detected magnetic field of the steel wire cable W. This also makes it possible to easily determine the state (the presence or absence of damage or the like) of the steel wire cable W because the detection is performed in a state in which the variation in the magnitude and orientation of the magnetization is reduced.

Further, in the third embodiment, as described above, the detection unit 202 is configured such that at least one magnetic sensor element 23 for detecting the magnetic field of the steel wire cable W is arranged outside the steel wire cable W. Thus, since the limitation of the size or the installation state of the steel wire cable W is relaxed, unlike the detection unit 2 including a coil for causing the steel wire cable W to pass through, it is possible to extend the application range.

The other effects of the third embodiment are the same as those of the first embodiment.

(Modifications)

It should be understood that the embodiments disclosed here are examples in all respects and are not restrictive. The scope of the present invention is indicated by the appended claims rather than by the description of the above-described embodiments and includes all modifications (changes) within the meanings and the scopes equivalent to the scope of the claims.

For example, in the first to third embodiments described above, an example is shown in which the magnetic body is an elongated member, but the present invention is not limited thereto example. For example, the magnetic body may be, for example, a sheet other than an elongated member or an iron ball (bearing). Alternatively, the present invention can be used to inspect an entire magnetic body having a uniform structure. Further, in cases where the magnetic body is a thin plate or the like, it may be configured such that a magnetic field is applied in a direction perpendicular to the surface of the thin plate or the like (in the direction of the thickness) to detect the magnetic field or the change in the magnetic field in the extending direction of the surface of the thin plate or the like.

In the first to third embodiments described above, an example is shown in which a magnetic body composed of an elongated member is a steel wire cable W, but the present invention is not limited thereto. For example, the magnetic body composed of an elongated member may be a thin plate, a square member, a cylindrical pipe, a wire, a chain, or the like.

Further, in the first to third embodiments described above, an example in which the magnetic field application unit 1 is integrally configured with the inspection unit U is shown, but the present invention is not limited thereto. For example, the relative positions of the magnetic field application unit 1 and the detection unit 2 may be configured to be changeable. Specifically, after rectifying the magnitude and orientation of the magnetization in the steel wire cable W by the magnetic field application unit 1 in the longitudinal direction (X-direction) of the steel wire cable W, only the magnetic field application unit 1 may be moved to a position away from the steel wire cable W. With this configuration, at the time of detecting the magnetic field of the change in the magnetic field of the steel wire cable W by the detection unit 2 (202, 203), it is possible to separate the magnetic field application unit 1 and the detection unit 2 (202, 203) so that the magnetic field of the magnetic field application unit 1 does not affect the detection unit 2 (202, 203).

Further, in the first to third embodiments, when applying the magnetic field in advance in the extending direction (X-direction) of the steel wire cable W, the magnetic field application unit 1 may be configured as shown in FIG. 16. Specifically, as shown in (A) of FIG. 16, a pair of the magnet 11a and the magnet 11b may be arranged so that S poles are opposed to each other. Further, the magnet 11c and the magnet 11d may be arranged so that S poles are opposed to each other. Further, as shown in (B) of FIG. 16, the arrangement direction of the magnetic field of the magnets 11a and 11b and the arrangement direction of the magnetic field of the magnets 11c and 11d may not be parallel (one of them is arranged in the Y-direction, and the other is arranged in a direction inclined by an angle θ with respect to the Y-direction). Further, as shown in (C) of FIG. 16, it may be configured such that the magnets 11a and 11b (or the magnets 11c and magnet 11d) are provided only on one side of the detection unit 2.

Further, in the first to third embodiments described above, an example is shown in which the magnetic field application unit 1 is configured by a permanent magnet, but the present invention is not limited thereto. In the present invention, the magnetic field application unit 1 may be constituted by an electromagnet (coil).

In the first to third embodiments described above, an example is shown in which the magnetic field application unit 1 includes a pair of magnets 11, but the present invention is not limited thereto. For example, as shown in (A) of FIG. 17, it may be configured to include a ring-shaped magnet 11e (magnet 11f). As the ring-shaped magnet 11e (magnet 11f), as shown in (B) of FIG. 17, it may be used such that the N pole (or S pole) is arranged on the inner side of the ring and the S pole (or N-pole) is arranged on the outer side of the ring. By using a ring-shaped magnet 11e (magnet 11f) as shown in (B) of FIG. 17, it is possible to arrange so as to face the same polarity (N pole) across the steel wire cable W by one magnet.

Figure 18:
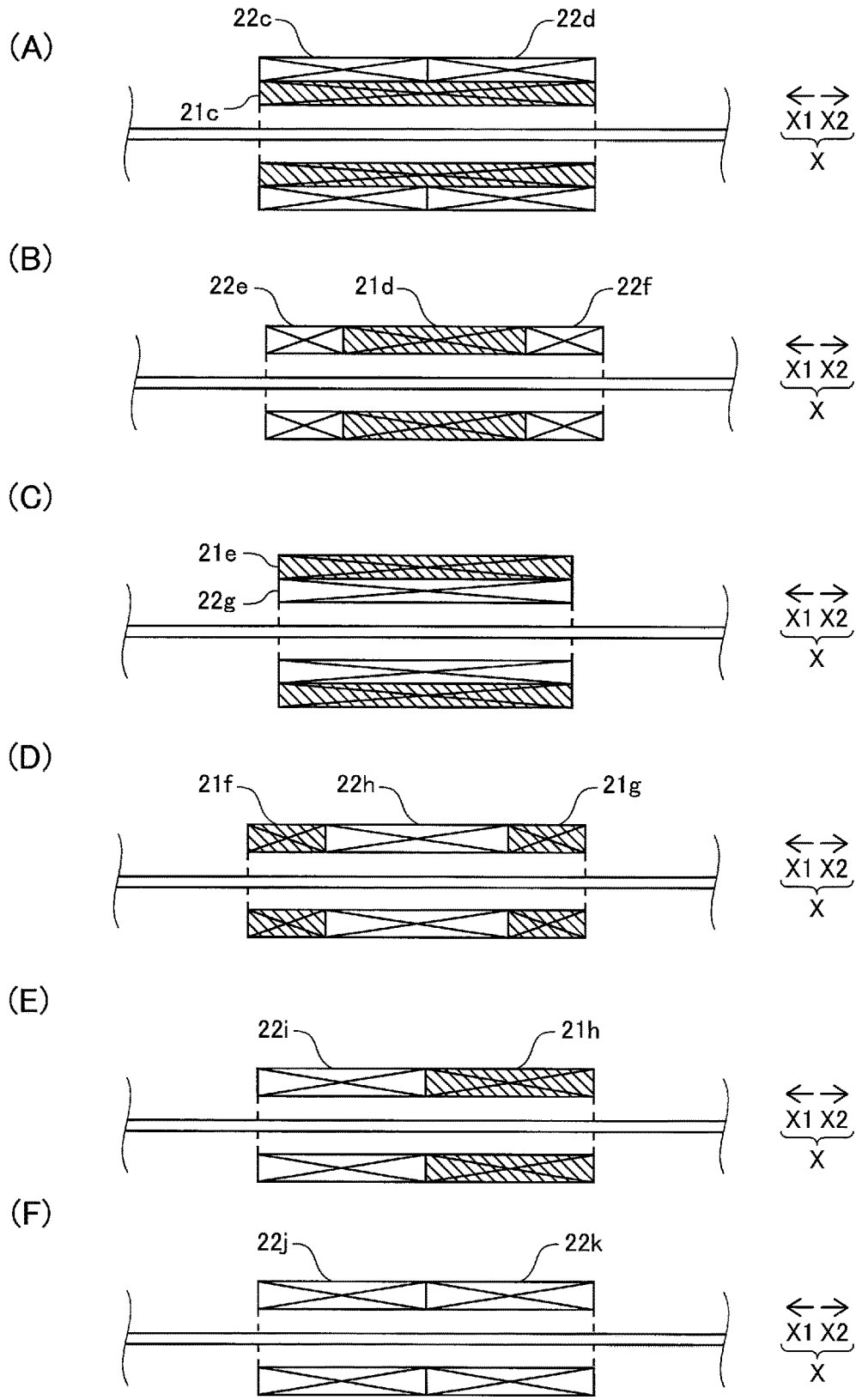
FIG. 18 shows a schematic diagram (A) to a schematic diagram (F) for explaining an excitation coil and a detection coil according to a third modification.

In the first and second embodiments described above, an example is shown in which the detection coils 22a and 22b serving as a differential coil are arranged inside the excitation coil 21, but the present invention is not limited thereto. In the present invention, as shown in (A) of FIG. 18, the detection coils 22c and 22d serving as a differential coil may be arranged on the outer side of the excitation coil 21c. Further, as shown in (B) of FIG. 18, the detection coils 22e and 22f serving as a differential coil may be arranged side by side in the X-direction (longitudinal direction) of the excitation coil 21d so as to sandwich the excitation coil 21d. Further, as shown in (C) of FIG. 18, a single detection coil 22g which is not a differential coil may be arranged inside (or outside) of the excitation coil 21e. Further, as shown in (D) of FIG. 18, the two excitation coils 21f and 21g may be arranged side by side in the X-direction (longitudinal direction) of the detection coil 22h so as to sandwich a single detection coil 22h. As shown in (E) of FIG. 18, a single excitation coil 21h and a single detection coil 22i may be arranged side by side in the X-direction (longitudinal direction). Further, as shown in (F) of FIG. 18, it may be configured such that the detection coils 22j and 22k (or, a single detection coil 22) serving as a differential coil are arranged and the excitation coil 21 is omitted.

Figure 19:
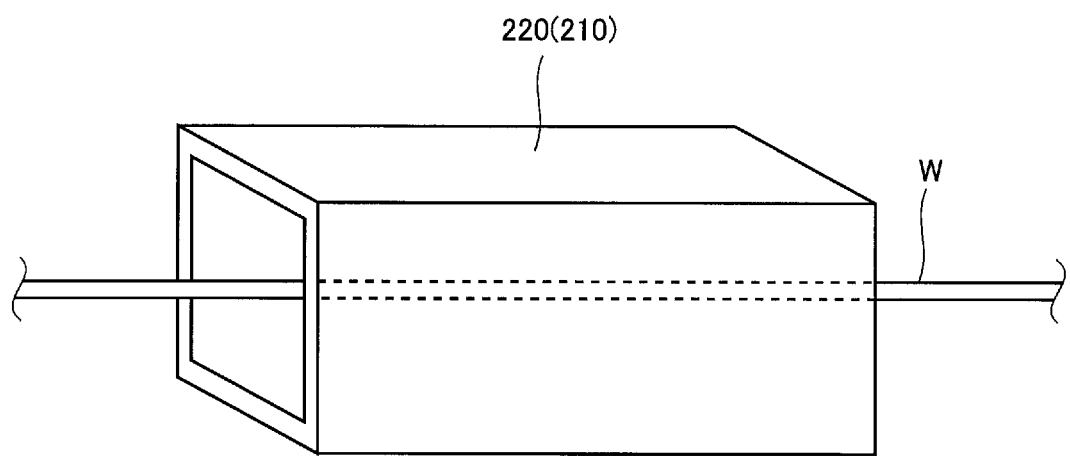
FIG. 19 shows a schematic diagram for explaining an excitation coil and a detection coil according to a fourth modification.

Further, in the first to third embodiments described above, an example is shown in which a cylindrical coil (detection coil 22 and excitation coil 21) is provided so as to surround the steel wire cable W, the present invention is not limited thereto. For example, as shown in FIG. 19, the detection coil 22 and the excitation coil 21 may be a square tube shaped detection coil 220 (excitation coil 210).

Figure 20:
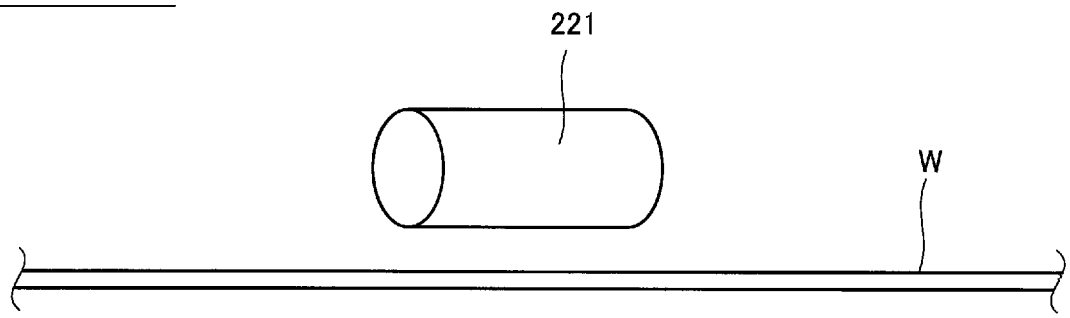
FIG. 20 shows a schematic diagram for explaining a detection coil according to a fifth modification.

In the first to third embodiments described above, an example is shown in which the detection coil 22 surrounds the steel wire cable W, but the present invention is not limited thereto. For example, as shown in FIG. 20, the detection coil 221 may be arranged at a position spaced away from the steel wire cable W by a predetermined distance so as to detect the magnetic field in the direction along the steel wire cable W. Further, as shown in FIG. 21, a cylindrical coil 20b (see (B) of FIG. 21) may be used in which two semi-cylindrical (horseshoe) coil portions 20a (see (A) of FIG. 21) are combined. Note that a semi-cylindrical (horseshoe-shaped) coil is easily detachable even in cases where the steel wire cable W is installed (the end portion is closed).

In the third embodiment described above, an example is shown in which a plurality of magnetic sensor elements 23 is arranged so as to surround the steel wire cable W, but the present invention is not limited thereto. For example, at least one magnetic sensor element 23 may be arranged at a position capable of detecting the magnetic field of the steel wire cable W. A plurality of magnetic sensor elements 23 may be so as to detect two or three directions.

In the first embodiment 1 to third embodiment described above, an example is shown in which the magnetic body inspection device 100 (200, 300, inspection unit U) is configured to be movable along the steel wire cable W, but the present invention is not limited thereto. For example, the magnetic body inspection device 100 (200, 300, inspection unit U) may be configured not to move. In this case, the magnetic body inspection device 100 (200, 300) detects the magnetic field of the steel wire cable W passing through the inside or the vicinity at the predetermined position.

Further, in the first to third embodiments described above, an example is shown in which when the detection signal output by the detection coil 22 (detection unit 2 (202, 203)) has exceeded predetermined thresholds Th (first threshold Th1 and second threshold Th2), the electronic circuit unit 3 (302, 303) is configured to output a signal to the outside, the present invention is not limited thereto. For example, it may be configured such that when the number of times N that the detection signal has exceeded a threshold is counted and the number of times counted has exceeded the predetermined number of times M, the electronic circuit unit 3 (302, 303) output the signal indicating that the number of times counted has exceeded the predetermined number of times. With this configuration, the electronic circuit unit 3 (302, 303) counts the number of times N exceeding the threshold Th, and it is possible to determine the state of deterioration of the steel wire cable W based on the number of damage or the like. Further, the electronic circuit unit 3 (302, 303) may be configured to determine the temporal changes (e.g., the progress rate of degradation) of the state of presence or absence of damage or the like of the steel wire cable W by comparing the number of times N exceeding threshold Th at the time of the previous measurement with the number of times N exceeding the threshold Th at the time of the present measurement. Further, the number of the predetermined thresholds Th may be one or more than two (e.g., three).

In the first to third embodiments described above, an example is shown in which the magnetic body inspection device 100 (200, 300) is used in a mobile X-ray imaging apparatus 900, but the present invention is not limited thereto. In the present invention, the magnetic body inspection device 100 (200, 300) may be applied to a stationary X-ray irradiation apparatus (X-ray imaging apparatus) 901 shown in (A) of FIG. 22, a stand-type X-ray irradiation apparatus (X-ray imaging apparatus) 902 shown in (B) of FIG. 22, and a stand-type X-ray detection apparatus (X-ray imaging apparatus) 903 shown in (C) of FIG. 22. It is also applicable to infrastructures utilizing a cable, such as, e.g., a moving apparatus including an elevator and a ropeway, and a wire/cable part of a suspension bridge, a bridge pier or the like. In addition, it is applicable not only to a cable but also to all applications for measuring damage of magnetic body, such as, e.g., a utility pole, a water and sewerage pipe, a gas pipeline, and a pipeline. Note that the X-ray irradiation unit E1*l* and the X-ray irradiation unit E12 are both a portion for irradiate X-rays and include an FPD. The X-ray irradiation unit E1*l*, the X-ray irradiation unit E12, and the X-ray detection unit E23 each are supported by a steel wire cable W. Further, the magnetic body inspection device 100 (200, 300) is configured to be movable along the steel wire cable W.

In the first to third embodiment described above, the description is made mainly exemplifying the damage on the surface of the magnetic body as the "damage or the like", however, the detection target also includes breakage (not a complete breakage, but disconnection of the wire strand in the case of a wire rope/cable), changes in thickness, corrosion (rust), cracking, and non-uniformity in the magnetic. Further, the detection target is not limited to a surface of a magnetic body, and may be an inner portion thereof. In addition, as long as it is in a state of causing a magnetic field in a magnetic body or a non-uniformity of a magnetic field of a magnetic body, it is possible to detect as the "state of a magnetic body".

Further note that "magnetic field or the change in the magnetic field of the magnetic body" includes the magnetic field or the change in the magnetic field observed in the vicinity of the magnetic body to which a magnetic field has been applied when a magnetic field is applied externally, as well as the magnetic field or the change in the magnetic field resulting from the magnetic body itself when the magnetic field is not applied externally.

DESCRIPTION OF SYMBOLS

1: Magnetic field application unit
1*a*: First magnetic field application unit
1*b*: Second magnetic field application unit
2, 202, 203: Detection unit
3, 302, 303: Electronic circuit unit (determination unit)
14*y*: Yoke portion (magnetic field application unit)
21, 21*a*, 21*b*, 21*c*, 21*d*, 21*e*, 21*f*, 21*g*, 21*h*, 210: Excitation coil
22, 22*a*, 22*b*, 22*c*, 22*d*, 22*e*, 22*f*, 22*g*, 22*h*, 22*i*, 22*j*, 22*k*, 220, 221: Detection coil
23: Magnetic sensor element
100. 200, 300: Magnetic body inspection device
900: Mobile X-ray imaging apparatus (X-ray imaging apparatus)
901: Stationary X-ray imaging apparatus (X-ray imaging apparatus)
902: Stand-type X-ray irradiation apparatus (X-ray imaging apparatus)
903: Stand-type X-ray detection apparatus (X-ray imaging apparatus)
E1, E1*l*, E12: X-ray irradiation unit
E2, E23: X-ray detection unit
M: Predetermined number of times
Pf, Pf1, Pf2: Pole face
Th: Predetermined threshold
Th1: Predetermined first threshold
Th2: Predetermined second threshold
X-direction: The direction in which magnetic body extends, the direction in which elongated member extends, and the direction in which elongated member extends.
W: Steel wire cable (magnetic body, elongated member, cable)

The invention claimed is:

1. A magnetic body inspection device comprising:
a magnetic field application unit configured to apply a magnetic field to a magnetic body to be inspected in advance to rectify magnitude and orientation of magnetization in the magnetic body, the magnetic body being an elongated member; and
a detection unit configured to output a detection signal based on a magnetic field in the magnetic body to which the magnetic field has been applied by the magnetic field application unit or a change in the magnetic field,
wherein the magnetic field application unit includes magnets arranged so that pole faces of the same polarity are opposed to each other on both sides of the magnetic body,
wherein the magnetic body has a central axis,
wherein the magnetic field application unit and the detection unit are arranged in parallel with each other along the central axis, and
wherein the detection unit includes a detection coil configured to generate the detection signal, the detection coil being provided so as to be wound around the magnetic body.

2. The magnetic body inspection device as recited in claim 1,
wherein the magnets arranged so that the pole faces of the same polarity are opposed to each other on both sides of the magnetic body are configured to generate a region for canceling magnetic fields with respect to the magnetic body and a magnetization rectification region for rectifying the magnitude and orientation of the magnetization in the magnetic body by applying a magnetic field to the magnetic body before and after the region for canceling magnetic fields.

3. The magnetic body inspection device as recited in claim 2,
wherein the magnetic field application unit is configured to invert an orientation of the magnetic field applied to the magnetic body in the magnetization rectification regions across the region for canceling magnetic fields.

4. The magnetic body inspection device as recited in claim 3,
wherein the magnetic field application unit is provided at a position spaced apart from the detection unit in an extending direction of the elongated member by a predetermined distance.

5. The magnetic body inspection device as recited in claim 3,
wherein the detection unit is configured to detect a change in the magnetic field in an extending direction of the magnetic body to generate the detection signal.

6. The magnetic body inspection device as recited in claim 5,
wherein the detection coil includes a differential coil including two coil portions, the detection coil being configured to output each of the detection signals of the two coil portions generated by the magnetic field in the extending direction of the magnetic body.

7. The magnetic body inspection device as recited in claim 2,
wherein the magnets are composed of a pair of magnets arranged so as to sandwich the magnetic body, and
wherein the pair of magnets is configured to apply a magnetic field to the elongated member mainly in a direction along an extending direction of the elongated member.

8. The magnetic body inspection device as recited in claim 7,
wherein the pair of magnets is arranged so that pole faces of one of the same polarities of the pair of magnets are not opposed to each other and pole faces of the other of the same polarities of the pair of magnets are opposed to each other.

9. The magnetic body inspection device as recited in claim 1, further
a determination unit configured to determine a state of the magnetic body based on the detection signal output by the detection unit,
wherein the determination unit is configured, when the detection signal output by the detection unit has exceeded one or a plurality of predetermined thresholds, to output one or a plurality of threshold signals indicating that the detection signal has exceeded the one or the plurality of predetermined thresholds to an outside.

10. The magnetic body inspection device as recited in claim 9,
wherein the determination unit is configured to count the number of times that the detection signal output by the detection unit has exceeded the one or the plurality of predetermined thresholds and, when the counted number of times has exceeded a predetermined number of times, output a signal indicating that the counted number of times has exceeded the predetermined number of times to an outside.

11. The magnetic body inspection device as recited in claim 1,
wherein the detection unit includes an excitation coil for exiting a magnetization state of the magnetic body, the detection unit being configured to detect a magnetic field in the magnetic body in which a magnetization state is excited by a magnetic field generated by an excitation current flowing through the excitation coil, the magnetic field being extended in an extending direction of the magnetic body, or detect a change of the magnetic field in the magnetic body.

12. The magnetic body inspection device as recited in claim 11,
wherein the magnetic field to be applied to the magnetic body by the magnetic field application unit is greater than a magnetic field generated by the excitation coil to excite the magnetization state of the magnetic body.

13. The magnetic body inspection device as recited in claim 1,
wherein the detection unit is configured to detect the magnetic field in the magnetic body in the extending direction of the magnetic body or the change in the magnetic field at a detection position of the detection unit by relatively moving the magnetic body with respect to the detection unit in an extending direction of the magnetic body.

14. The magnetic body inspection device as recited in claim 1,
wherein the magnetic body includes a cable for moving at least one of an X-ray irradiation unit for irradiating a subject with X-rays and an X-ray detection unit for detecting X-rays transmitted through the subject, the X-ray irradiation unit and the X-ray detection unit being provided to an X-ray imaging apparatus so as to be movable relative to the subject, and
wherein the detection unit is configured to detect the magnetic field in the cable in an extending direction of the cable.

15. The magnetic body inspection device as recited in claim 1,
wherein the magnetic field application unit includes, in an extending direction of the magnetic body, a first magnetic field application unit provided at one side of the detection unit and a second magnetic field application unit provided at the other side thereof, and
wherein the first magnetic field application unit and the second magnetic field application unit are provided separately in the extending direction of the magnetic body.

16. A magnetic body inspection method, comprising
a step of rectifying magnitude and orientation of magnetization in a magnetic body by applying a magnetic field to a magnetic body to be inspected in advance by a magnetic field application unit including magnets arranged so that pole faces of the same polarity are opposed to each other on both sides of the magnetic body, the magnetic body being an elongated member; and
a step of detecting a magnetic field in the magnetic body to which the magnetic field has been applied or a change in the magnetic field in the magnetic body and outputting a detection signal based on the detected magnetic field in the magnetic body or the detected change in the magnetic field of the magnetic body,
wherein the magnetic body has a central axis, and
wherein in the step of outputting the detection signal, the detection signal generated by a detection coil is output, the detection coil being provided so as to be wound around the central axis of the magnetic body.

17. The magnetic body inspection method as recited in claim 16,
wherein in the step of rectifying the magnitude and the orientation of the magnetization in the magnetic body, the magnetic field is applied to the magnetic body by a first magnetic field application unit and a second magnetic field application unit, the first magnetic field application unit and the second magnetic field application unit being included in the magnetic field application unit and being separately provided on one side of a detection unit and the other side thereof in the extending direction of the magnetic body.

* * * * *